US012160285B2

(12) United States Patent
Åström et al.

(10) Patent No.: US 12,160,285 B2
(45) Date of Patent: Dec. 3, 2024

(54) INTELLIGENT SURFACES FOR USE IN A WIRELESS COMMUNICATION SYSTEM

(71) Applicant: Telefonaktiebolaget LM Ericsson (publ), Stockholm (SE)

(72) Inventors: Magnus Åström, Lund (SE); Bengt Lindoff, Bjärred (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 31 days.

(21) Appl. No.: 17/928,497

(22) PCT Filed: May 29, 2020

(86) PCT No.: PCT/EP2020/065081
§ 371 (c)(1),
(2) Date: Nov. 29, 2022

(87) PCT Pub. No.: WO2021/239259
PCT Pub. Date: Dec. 2, 2021

(65) Prior Publication Data
US 2023/0246674 A1    Aug. 3, 2023

(51) Int. Cl.
*H04B 7/04* (2017.01)
*H04B 1/401* (2015.01)
(52) U.S. Cl.
CPC ......... *H04B 7/04013* (2023.05); *H04B 1/401* (2013.01)
(58) Field of Classification Search
CPC .............................. H04B 7/04013; H04B 1/401
(Continued)

(56) References Cited

U.S. PATENT DOCUMENTS 10,419,948 B1    9/2019 Labadie et al.
2011/0244786 A1  10/2011 Fujii et al.
(Continued)

FOREIGN PATENT DOCUMENTS

EP    3439107 A1    2/2019
GB    2489282 A     9/2012
(Continued)

OTHER PUBLICATIONS

International Search Report and Written Opinion dated Feb. 2, 2021 for International Application No. PCT/EP2020/065081 filed May 29, 2020; consisting of 10 pages.
(Continued)

*Primary Examiner* — Kevin M Burd
(74) *Attorney, Agent, or Firm* — Weisberg I.P. Law, P.A.

(57) ABSTRACT

A method, controller and network node for using intelligent surfaces in a wireless communication system are disclosed. According to one aspect, method in a network node configured to communicate with a wireless device (WD), via a reconfigurable reflective surface, the reconfigurable reflective surface being controllable by a controller and being applied to a structure to controllably reflect signals exchanged between the network node and the WD. The method includes determining a configuration of the reconfigurable reflective surface associated with the WD, the determined configuration being associated with a particular reflection coefficient, transmitting to the controller of the reconfigurable reflective surface, an indication of the determined configuration, and receiving signals from the WD at least partially via reflection at the reconfigurable reflective surface.

18 Claims, 12 Drawing Sheets

(58) Field of Classification Search
USPC .......................................................... 375/262
See application file for complete search history.

(56) References Cited

U.S. PATENT DOCUMENTS

| | | | |
|---|---|---|---|
| 2016/0233971 | A1 | 8/2016 | Fink et al. |
| 2019/0044246 | A1 | 2/2019 | Pitsillides et al. |
| 2019/0181920 | A1 | 6/2019 | Rofougaran et al. |
| 2021/0013619 | A1* | 1/2021 | Alkhateeb ............ H01Q 15/148 |
| 2023/0074103 | A1* | 3/2023 | Liu ......................... H04B 7/145 |
| 2023/0176174 | A1* | 6/2023 | Penna ................. G01S 5/02521 |
| | | | 342/451 |
| 2023/0208479 | A1* | 6/2023 | Wang ................... H04B 7/0617 |
| | | | 375/262 |

FOREIGN PATENT DOCUMENTS

| | | |
|---|---|---|
| KR | 20170025422 A | 3/2017 |
| WO | 2014104954 A1 | 7/2014 |

OTHER PUBLICATIONS

Wu, Q., et al., Intelligent Reflecting Surface Enhanced Wireless Network via Joint Active and Passive Beamforming, IEEE Transactions on Wireless Communications, vol. 18, No. 11, Aug. 23, 2019, consisting of 16 pages.
Zhang, L., et al., Augmenting Transmission Environments for Better Communications: Tunable Reflector Assisted MmWave WLANs, IEEE Transactions on Vehicular Technology, vol. 69, No. 7, Apr. 30, 2020, consisting of 13 pages.
Nadeem, Q., et al., Intelligent Reflecting Surface Assisted Wireless Communication: Modeling and Channel Estimation, Dec. 13, 2019, consisting of 7 pages.
Zhang, Q., et al., Millimeter Wave Communications with an Intelligent Reflector: Performance Optimization and Distributional Reinforcement Learning, Feb. 24, 2020, consisting of 30 pages.
Di Renzo, M., et al., Smart Radio Environments Empowered by AI Reconfigurable Meta-Surfaces: An Idea Whose Time Has Come, Mar. 21, 2019, consisting of 32 pages.
Yuan, X., at al., Reconfigurable-Intelligent-Surface Empowered Wireless Communications: Challenges and Opportunities, Aug. 17, 2020, consisting of 7 pages.
3GPP Ts 36.331, 3rd Generation Partnership Project; Technical Specification Group Radio Access Network; Evolved Universal Terrestrial Radio Access (E-UTRA); Radio Resource Control (RRC); Protocol specification (Release 16); Sep. 2020; consisting of 1081 pages.
International Search Report and Written Opinion dated Dec. 1, 2021 for International Application No. PCT/EP2021/055789 filed Mar. 8, 2021; consisting of 9 pages.
International Search Report and Written Opinion dated Jul. 1, 2021 for International Application No. PCT/EP2020/078388 filed on Oct. 9, 2020, consisting of 9 pages.
Gopi, S., et al., Intelligent Reflecting Surface Assisted Beam Index-Modulation for Millimeter Wave Communication, IEEE Transactions on Wireless Communications, vol. 20, No. 2, Oct. 15, 2020, consisting of 14 pages.

* cited by examiner

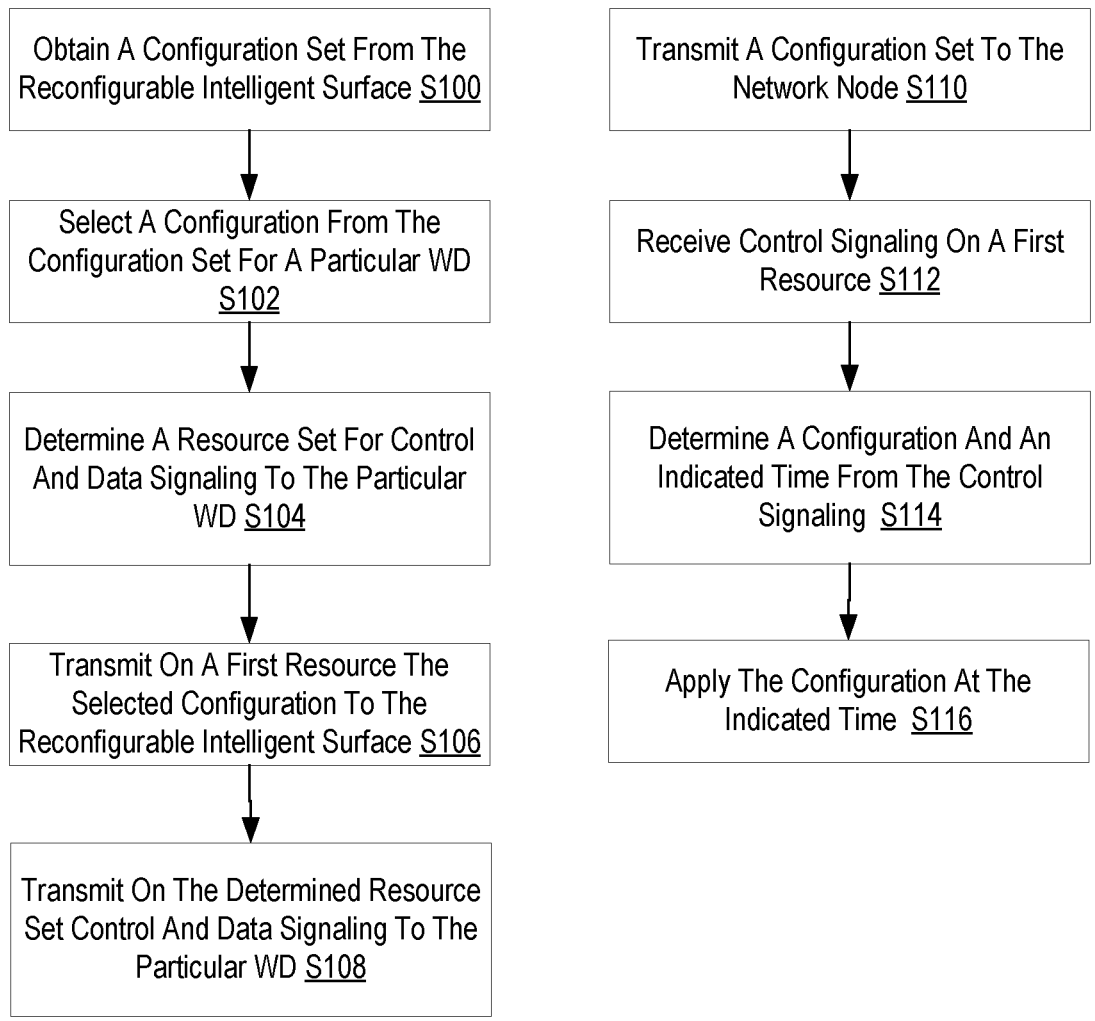

Determine A Configuration Of The Reconfigurable Reflective Surface Associated With The WD, The Determined Configuration Being Associated With A Particular Reflection Coefficient S138

Transmit To The Controller Of The Reconfigurable Reflective Surface, An Indication Of The Determined Configuration S140

Receive Signals From The WD At Least Partially Via Reflection At The Reconfigurable Reflective Surface S142

FIG. 14

INTELLIGENT SURFACES FOR USE IN A WIRELESS COMMUNICATION SYSTEM

CROSS-REFERENCE TO RELATED APPLICATIONS

This application is a Submission Under 35 U.S.C. § 371 for U.S. National Stage Patent Application of International Application Number: PCT/EP2020/065081, filed May 29, 2020 entitled "INTELLIGENT SURFACES FOR USE IN A WIRELESS COMMUNICATION SYSTEM," the entirety of which is incorporated herein by reference.

TECHNICAL FIELD

The present disclosure relates to wireless communication and in particular, to intelligent surfaces for use in a wireless communication system.

BACKGROUND

Advancing wireless communication requires new methods to enhance capacity and system performance over what currently specified $3^{rd}$ Generation Partnership Project (3GPP) Fifth Generation (5G) (also referred to as New Radio (NR)) systems will provide. For example, millimeter waves (mmWaves) (signals having frequencies above 100 GHz) are introduced in 5G. This enables GHz bandwidths and correspondingly high bit rates. However, mmWaves are sensitive to objects blocking the radio waves. FIG. 1 shows an example. In FIG. 1, a first network node 12 (which may also be referred to as a radio base station (RBS)) is in line of sight (LOS) communication with a wireless device (WD) 14. A second network node 16 attempts to communicate with the WD 14 but is blocked by structures A and B. Structure B is shown as reflecting an incident signal from the network node 16 at an angle which does not result in communication with the WD 14. Suppose that the network node 12 is further away from the WD 14 than is the network node 16. In this case, the signal from the network node 12 experiences greater path loss (i.e., the received signal strength indicator (RSSI) at the wireless device is low).

One technique being considered is to create smart radio environments. Instead of seeing the environment as passive elements, there are ongoing research projects to create surfaces that can interact with the radio environment. Such surfaces are called intelligent surfaces, meta-surfaces, reconfigurable reflect arrays, software controlled meta-surfaces, reconfigurable intelligent surfaces (rIS), intelligent reconfigurable reflective arrays, reconfigurable reflective surfaces, and reconfigurable reflective surfaces. The terms, reconfigurable reflective surface and rIS are used interchangeably herein to indicate such surfaces.

An electromagnetic reconfigurable reflective surface is a surface made of electromagnetic material that is engineered in order to exhibit properties that are not found in naturally occurring materials. A reconfigurable reflective surface is, in practice, an electromagnetic discontinuity, which can be defined as a complex electromagnetic structure that has a thickness which is much smaller than a wavelength of an incident electromagnetic wave. Typically, the reconfigurable reflective surface (also referred to as an rIS, short for reconfigurable intelligent surface) is electrically large in transverse size, and is composed of sub-wavelength scattering particles with extremely small features. In simple terms, a reconfigurable reflective surface is made of a two-dimensional array of sub-wavelength metallic or dielectric scattering particles that transform the electromagnetic waves in different ways.

A major difference between a nonreconfigurable reflective surface and a reconfigurable reflective surface lies in the capability of the latter to shape the radio waves according to the generalized Snell's laws of reflection and refraction. For example, the angles of incidence and reflection of the radio waves are not necessarily the same in a reconfigurable reflective surface.

FIG. 2 shows use of a reconfigurable reflective surface 10 on the structure B to reflect signals from the network node 16 toward the WD 14, and reflect signals from the WD 14 toward the network node 16. Since wireless devices are typically moving objects, the reflections from the reconfigurable reflective surface 10 may miss the moving wireless device.

A reconfigurable reflective surface can be modified depending on the stimuli that the reconfigurable reflective surface receives from the external world. In one example, the reconfigurable reflective surface includes arrays of passive patch antennas, i.e., the antennas are not connected to active radio transceivers that are configured to perform modulation/demodulation and frequency up and down conversion. Instead, the antennas in the array are connected through tunable impedances towards a ground plane such that the reflection phase of a respective antenna can be adapted based on an impedance setting. By controlling the impedances of the respective patch antennas, the reflection radio wave arising from reflection of an incoming radio wave can be adapted according to the generalized Snell's law, which predicts angles of reflection that may be different from angles of incidence. Hence, the reflection angle can be adapted in a reconfigurable reflective surface. However, known techniques do not disclose how the reconfigurable reflective surface should adapt the reflection for a moving wireless device. Furthermore, a cellular system may support network nodes to communicate to multiple wireless devices, and known methods do not disclose how a network node should control the reflection angle in the reconfigurable reflective surface for multiple wireless devices.

Present communication between a network node (radio base station) and a wireless device takes place without any intelligent surfaces reflecting signals intelligently between the two. This implies that devices cannot rely on additional assistance from its surroundings other than what already exists.

Intelligent Surface Deployment

Network node and antenna deployment are associated with regulatory restrictions on transmission of radio waves. Hence, in order to allow flexible deployment, an intelligent surface will typically not include an active transmitter on a higher power level than an ordinary wireless device.

LoS

For higher carrier frequencies, communication between the network node and the wireless device relies on a clear line of sight (LoS) between them. When this is not possible, a reconfigurable reflective surface (rIS) may act as a reflector of radio signals such that a pseudo-line of sight channel may be established.

Known, i.e., legacy communication standards, such as 3GPP Fourth Generation (4G) and 5G standards, do not specify or allow for reconfigurable reflective surfaces to be used for creating pseudo-line of sight channels. Hence, e.g., millimeter wave (mmW) communications are restricted to relatively rare situations where LOS is achieved without the reconfigurable reflective surface.

SUMMARY

Some embodiments advantageously provide a method and system for use of intelligent surfaces in a wireless communication system. In some embodiments, a control signaling channel is defined between the network node and the reconfigurable reflective surface (rIS). A control signal may be transmitted on the control signaling channel and may indicate which reflection setting the reconfigurable reflective surface should use at a specific time instant or during a specified duration of time. The network node may receive a configuration set from the reconfigurable reflective surface describing possible reflection settings at the reconfigurable reflective surface. The reconfigurable reflective surface may communicate the configuration set on the control signaling channel or another channel. The network node may determine which configuration is associated with a respective connected wireless device. Once a resource set is allocated to a wireless device (either for uplink or downlink communication), the network node may send a control signal to the rIS indicating which configuration of the set of configurations the rIS is to use at a particular time. The rIS may adopt the configuration as indicated. The communication from the network node to the wireless device may use a first frequency, for instance mmWave communication, while the control signaling may use a second frequency (a sub 6 GHz frequency, for example) or may use wired, optical or other communication techniques, for example.

Thus, to intelligently use these reconfigurable reflective surfaces, the network node is equipped to identify a particular configuration that will best facilitate a pseudo-LOS. The configurations may be made known to the network node at the time of deployment of the rIS and/or the network node, or the configurations may be made known to the network node at or before a time of resource allocation to a WD.

In order to broaden the application of mmW communications, there is a need to configure the reconfigurable reflective surface such that a pseudo-LOS may be established between the wireless device and the network node.

In some embodiments, the network node determines the WD location (position) relative to the rIS. The rIS position is known by the network node, and the rIS is in communication via a control channel (wired or wireless) to the network node so that the network node can control/configure the rIS reflection angles). The network node may also determine whether the network node should involve the rIS in further communication with the WD. The determination of an rIS configuration to be selected for a particular WD can be based on information available at the network node. This information may include some or all of the following:
 WD location information received from the WD (e.g., Global Positioning System (GPS) coordinates);
 Reference signal received power (RSRP)/received signal strength indicator (RSSI) measurement report received from WD;
 Received information about the WD location from rIS;
 Based on a time of arrival (ToA) determination of WD signals in the network node;
 RSRP/RSSI measurement, etc., received from the rIS; and/or
 Beam preference.

If the connection to the WD is via the rIS, the network node may send at least a first message to the rIS, and if the connection to the WD is not via the rIS, the network node may send a second message to the rIS. The first message may include the reflection angle (configuration information) the rIS should use once the network node communicates with the WD, or in more general terms, a first mode of operation. The second message may inform the rIS to be set in a second mode of operation. The second mode of operation may be one of:
 Disabled;
 Idle mode; and
 Update mode.

Thus, some embodiments include a method for configuring the reconfigurable reflective surface such that it may act as a pseudo-mirror or reflector between a device and the network node. In doing that, it is first realized that both the network node and the reconfigurable reflective surface are stationary; hence the direction between the two is fixed. As a result, the single parameter that will affect the configuration of the reconfigurable reflective surface is the angle of arrival (AoA) from the wireless device to the reconfigurable reflective surface. Having determined this, it is possible to configure the reconfigurable reflective surface such that the reconfigurable reflective surface will correctly reflect signals between the wireless device and the network node. Thus, in some embodiments, the plurality of WDs may each send a pilot signal to the reconfigurable reflective surface from which the reconfigurable reflective surface can ascertain the angles of arrival of the pilot signals.

Furthermore, assuming LOS, the angle of arrival will be constant for all frequencies. Hence, it is possible to use one frequency to determine the AoA and apply it to another frequency.

Some embodiments provide a more flexible utilization of a rIS by exercising control over the configuration of the rIS. Some embodiments may allow for communication with multiple devices and in multiple directions, thereby providing increased network capacity.

Some advantages of some embodiments allow reconfigurable reflective surfaces to be used in communications between a network node and a wireless device, and also allow more efficient use of surfaces, e.g., by introducing parallelism in the use of reconfigurable reflective surfaces. This results in improved network capability, increased power efficiency and a better user experience.

Having proper information about when a device may utilize a reconfigurable reflective surface makes use of the rIS feasible. Without such information, it might not be possible to take full advantage of the reconfigurable reflective surfaces, thereby missing many better radio channels. This is true in particular for higher frequencies that will require LoS or semi-LoS conditions to be operable.

Some embodiments provide an efficient approach to configuring the reconfigurable reflective surface to reflect a signal between a device and a network node. Hence, the surface may be utilized more efficiently and serve more devices, providing increased network capacity.

According to one aspect, a network node is configured to communicate with a wireless device, WD, via a reconfigurable reflective surface, the reconfigurable reflective surface being controllable by a controller to controllably reflect signals exchanged between the network node and the WD. The network node includes processing circuitry configured to determine a configuration of the reconfigurable reflective surface associated with the WD, the determined configuration being associated with a particular reflection coefficient. The network node also includes at least one transceiver in communication with the processing circuitry, the at least one transceiver being configured to transmit to the controller of the reconfigurable reflective surface, an indication of the determined configuration, and receive signals from the WD and transmit signals to the WD at least partially via reflection at the reconfigurable reflective surface.

According to this aspect, in some embodiments, the transmitting to the controller is at one frequency different from a frequency of signals transmitted to the WD. In some embodiments, the determined configuration is selected from a set of predetermined configurations, each configuration in the set being associated with a particular reflection coefficient at a time of the selecting. In some embodiments, the processing circuitry is further configured to update the determining of the configuration periodically to account for movement of the WD, the updating being performed at a rate that is based at least in part on a rate of movement of the WD. In some embodiments, the determining of the configuration is based at least in part on selecting a configuration that results in a greatest improvement of throughput between the WD and the network node as compared to other configurations of the reconfigurable reflective surface. In some embodiments, the determining of the configuration is based at least in part on a previously determined configuration of the reconfigurable reflective surface. In some embodiments, the at least one transceiver is further configured to receive a capability report from the reconfigurable reflective surface, the capability report indicating a number of beams the reconfigurable reflective surface can resolve and reflect in different directions. In some embodiments, the capability report includes a number of reflection angles by which the reconfigurable reflective surface can simultaneously reflect signals incident upon the reconfigurable reflective surface. In some embodiments, the at least one transceiver is further configured to transmit a sounding signal receivable by the reconfigurable reflective surface to enable the controller to determine a beam width of the sounding signal. In some embodiments, the at least one transceiver is further configured to receive from the controller a time of arrival of the sounding signal at the reconfigurable reflective surface. In some embodiments, the processing circuitry is further configured to determine a number of beams that can be separately reflected at different angles by the reconfigurable reflective surface. In some embodiments, the determining of the configuration of the reconfigurable reflective surface is based at least in part on signaling received from the WD during a time when the reconfigurable reflective surface is configured with a configuration known to the network node. In some embodiments, the processing circuitry is further configured to switch between use and non-use of the reconfigurable reflective surface based at least in part on a comparison of a strength of the signals received from the WD with and without directing a beam to the WD via the reconfigurable reflective surface. In some embodiments, the at least one transceiver transmits a command directing the reconfigurable reflective surface to reconfigure to: a disabled mode in which the reconfigurable reflective surface is set to a default configuration; an idle mode in which the reconfigurable reflective surface awaits a next control signal from the network node; or an update mode in which the reconfigurable reflective surface reconfigures to a next configuration. In some embodiments, the determining of the configuration is based at least in part on an angle of arrival from the WD to the reconfigurable reflective surface. In some embodiments, the at least one transceiver is configured to transmit a signal instructing the WD to direct a beam to the reconfigurable reflective surface. In some embodiments, the determined configuration is selected based on a pilot signal received from the WD.

According to another aspect, a method is implemented in a network node configured to communicate with a wireless device (WD) via a reconfigurable reflective surface, the reconfigurable reflective surface being controllable by a controller to controllably reflect signals exchanged between the network node and the WD. The method includes determining a configuration of the reconfigurable reflective surface associated with the WD, the determined configuration being associated with a particular reflection coefficient. The method also includes transmitting to the controller of the reconfigurable reflective surface, an indication of the determined configuration, and receiving signals from the WD at least partially via reflection at the reconfigurable reflective surface.

According to this aspect, in some embodiments, the transmitting to the controller is at one frequency different from a frequency of signals transmitted to the WD. In some embodiments, the determined configuration is selected from a set of predetermined configurations, each configuration in the set being associated with a particular reflection coefficient at a time of the selecting. In some embodiments, the method further includes updating the determining of the configuration periodically to account for movement of the WD, the updating being performed at a rate that is based at least in part on a rate of movement of the WD. In some embodiments, the determining of the configuration is based at least in part on selecting a configuration that results in a greatest improvement of throughput between the WD and the network node as compared to other configurations of the reconfigurable reflective surface. In some embodiments, the determining of the configuration is based at least in part on a previously determined configuration of the reconfigurable reflective surface. In some embodiments, the method further includes receiving a capability report from the reconfigurable reflective surface, the capability report indicating a number of beams the reconfigurable reflective surface can resolve and reflect in different directions. In some embodiments, the capability report includes a number of reflection angles by which the reconfigurable reflective surface can simultaneously reflect signals incident upon the reconfigurable reflective surface. In some embodiments, the method further includes transmitting a sounding signal receivable by the reconfigurable reflective surface to enable the controller to determine a beam property of the sounding signal. In some embodiments, the method also includes receiving from the controller a time of arrival of the sounding signal at the reconfigurable reflective surface. In some embodiments, the method also includes determining a number of beams that can be separately reflected at different angles by the reconfigurable reflective surface. In some embodiments, the determining of the configuration of the reconfigurable reflective surface is based at least in part on signaling received from the WD during a time when the reconfigurable reflective surface is configured with a configuration known to the network node. In some embodiments, the method further includes switching between use and non-use of the reconfigurable reflective surface based at least in part on a comparison of a strength of the signals received from the WD with and without directing a beam to the WD via the reconfigurable reflective surface. In some embodiments, the method further includes transmitting a command directing the reconfigurable reflective surface to reconfigure to a disabled mode in which the reconfigurable reflective surface is set to a default configuration, an idle mode in which the reconfigurable reflective surface awaits a next control signal from the network node, or an update mode in which the reconfigurable reflective surface reconfigures to a next configuration. In some embodiments, the determining of the configuration is based at least in part on an angle of arrival from the WD to the reconfigurable reflective surface. In some embodiments, the at least one transceiver is configured to transmit a signal instructing the WD to direct a beam to the reconfigurable reflective surface. In some embodiments, the determined configuration is selected based on a pilot signal received from the WD.

According to yet another aspect, a controller in communication with a reconfigurable reflective surface is configured to communicate with a network node. The controller includes a transceiver configured to receive from the network node an indication of a configuration of the reconfigurable reflective surface. The controller also includes processing circuitry in communication with the transceiver, the processing circuitry configured to cause the transceiver to transmit at least one signal to the reconfigurable reflective surface to configure the reconfigurable reflective surface according to the indicated configuration, the indicated configuration being associated with at least one reflection coefficient.

According to this aspect, in some embodiments, the controller is in proximity to the reconfigurable reflective surface. In some embodiments, the transceiver is further configured to receive an indication of a configuration of the reconfigurable reflective surface periodically at a rate determined by the network node. In some embodiments, the transceiver is further configured to report a current configuration of the reconfigurable reflective surface in response to a query from the network node. In some embodiments, the transceiver is further configured to indicate a number of beams resolvable by the reconfigurable reflective surface. In some embodiments, the transceiver is further configured to receive a sounding signal from the network node, and the processing circuitry is further configured to determine a beam property of the sounding signal. In some embodiments, the processing circuitry is further configured to determine a time of arrival of the sounding signal, and the transceiver is further configured to transmit the time of arrival to the network node. In some embodiments, the processing circuitry is further configured to determine a number of beams that the reconfigurable reflective surface can resolve based at least in part on a received strength of the sounding signal. In some embodiments, the processing circuitry is further configured to determine a number of beams that can be separately reflected at different angles by the reconfigurable reflective surface. In some embodiments, the processing circuitry is further configured to determine a number of reflection angles that can be resolved by the reconfigurable reflective surface. In some embodiments, the processing circuitry is further configured to control a plurality of reconfigurable reflective surfaces oriented in layers. In some embodiments, the processing circuitry is further configured to configure the reconfigurable reflective surface to reflect multiple carriers at a same angle of reflection. In some embodiments, the processing circuitry is further configured to configure an active reconfigurable reflective surface. In some embodiments, the processing circuitry is further configured to configure the reconfigurable reflective surface to operate in one of a time division duplex mode and a frequency division duplex mode.

According to another aspect, a method in a controller in communication with a reconfigurable reflective surface is provided, where the controller is configured to communicate with a network node. The method includes receiving from the network node an indication of a configuration of the reconfigurable reflective surface, and sending at least one signal to the reconfigurable reflective surface to configure the reconfigurable reflective surface according to the indicated configuration, the indicated configuration being associated with at least one reflection coefficient.

According to this aspect, in some embodiments, the controller is in proximity to the reconfigurable reflective surface. In some embodiments, the method further includes receiving an indication of a configuration of the reconfigurable reflective surface periodically at a rate determined by the network node. In some embodiments, the method further includes reporting a current configuration of the reconfigurable reflective surface in response to a query from the network node. In some embodiments, the method further includes indicating a number of beams resolvable by the reconfigurable reflective surface. In some embodiments, the method also includes receiving a sounding signal from the network node and determining a beam width of the sounding signal. In some embodiments, the method also includes determining a time of arrival of the sounding signal and transmitting the time of arrival to the network node. In some embodiments, the method also includes determining a number of beams that the reconfigurable reflective surface can resolve based at least in part on a received strength of the sounding signal. In some embodiments, the method also includes determining a number of beams that can be separately reflected at different angles by the reconfigurable reflective surface. In some embodiments, the method further includes determining a number of reflection angles that can be resolved by the reconfigurable reflective surface. In some embodiments, the method further includes controlling a plurality of reconfigurable reflective surfaces oriented in layers. In some embodiments, the method further includes configuring the reconfigurable reflective surface to reflect multiple carriers at a same angle of reflection. In some embodiments, the method further includes configuring an active reconfigurable reflective surface. In some embodiments, the method further incudes configuring the reconfigurable reflective surface to operate in one of a time division duplex mode and a frequency division duplex mode.

BRIEF DESCRIPTION OF THE DRAWINGS

A more complete understanding of the present embodiments, and the attendant advantages and features thereof, will be more readily understood by reference to the following detailed description when considered in conjunction with the accompanying drawings wherein:

FIG. 4 is a flowchart of an exemplary process in a network node for utilizing an rIS according to principles set forth herein:

FIG. 5 is a flowchart of an exemplary process in an rIS for application of a configuration at a specific time according to principles set forth herein;

FIG. 14 is a flowchart of an exemplary process in a network node for configuring an rIS according to principles set forth herein.

DETAILED DESCRIPTION

Figure 1:
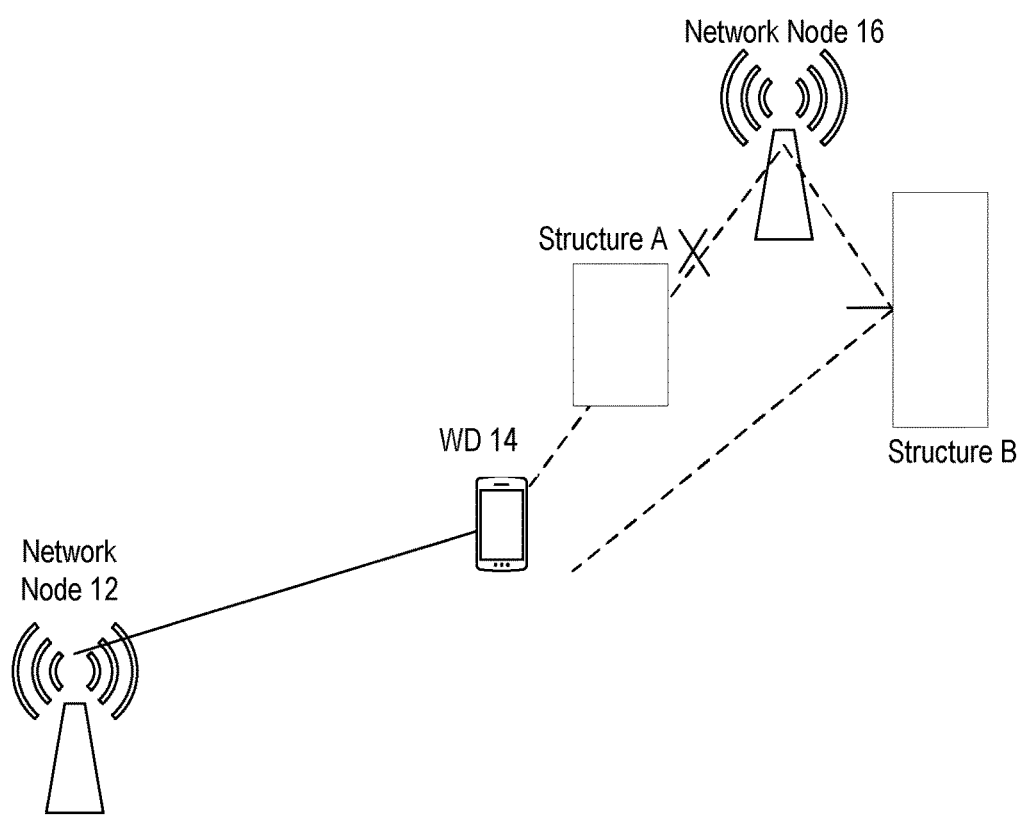
FIG. 1 is an illustration of LOS blocking by structures A and B.
Figure 2:
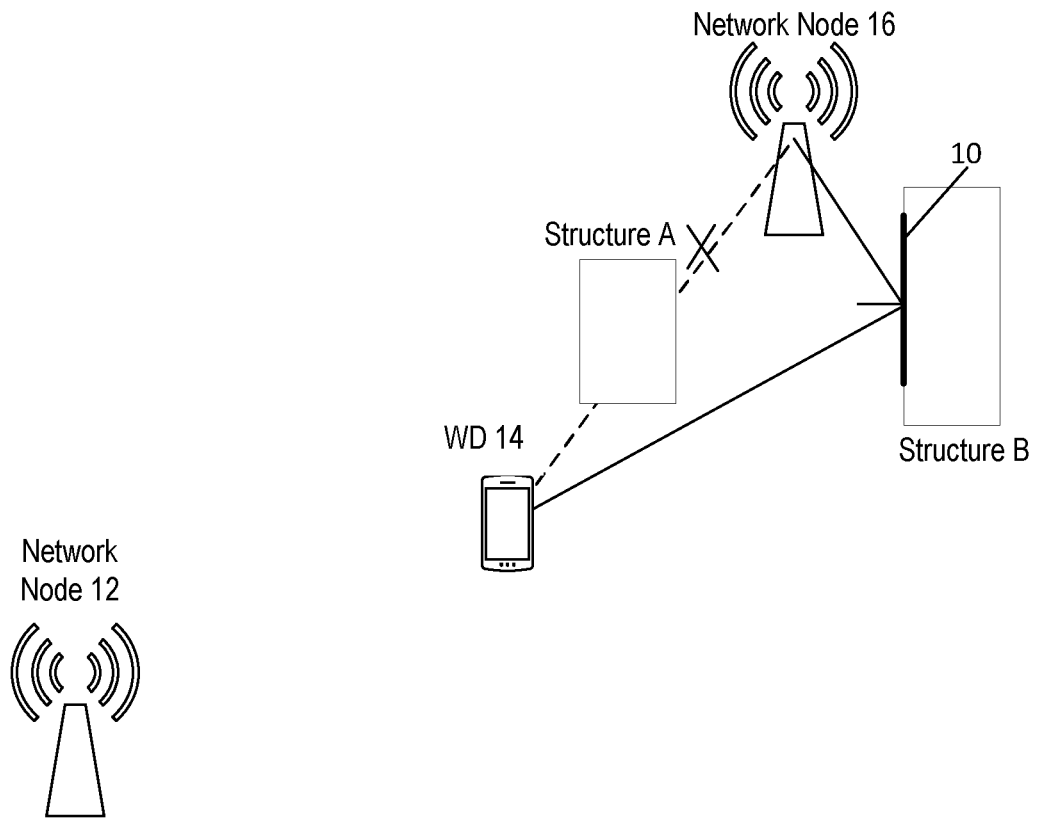
FIG. 2 is an illustration of an intelligent surface on structure B, the intelligent surface capable of reflecting at an angle of reflection that is not equal to the angle of incidence.

Before describing in detail exemplary embodiments, it is noted that the embodiments reside primarily in combinations of apparatus components and processing steps related to use of intelligent surfaces in a wireless communication system. Accordingly, components have been represented where appropriate by conventional symbols in the drawings, showing only those specific details that are pertinent to understanding the embodiments so as not to obscure the disclosure with details that will be readily apparent to those of ordinary skill in the art having the benefit of the description herein.

As used herein, relational terms, such as "first" and "second," "top" and "bottom," and the like, may be used solely to distinguish one entity or element from another entity or element without necessarily requiring or implying any physical or logical relationship or order between such entities or elements.

Some embodiments provide flexible utilization of a reconfigurable reflective surface by exercising active control over the reconfigurable reflective surface. Some embodiments may allow use of the rIS for more devices and in more directions, thereby providing increased network capacity.

Some embodiments allow reconfigurable reflective surfaces to be used in communications between a network node and a wireless device, and second, to allow more efficient use of such surfaces, e.g., by introducing parallelism in the use of reconfigurable reflective surfaces, resulting in improved network capability, increased power efficiency and a better user experience, as compared to implementations that do not take advantage of such parallelism.

Having proper information about when a network node may utilize a reconfigurable reflective surface to communicate with a WD makes use of the rIS feasible. Without such information it may not be possible to leverage rIS use, thereby missing out on many better radio channels. This is particularly true for higher frequencies that will require LoS or semi-LoS conditions to be operable.

Some embodiments provide an approach to configuring the reconfigurable reflective surface to reflect a signal between a device and a network node.

Figure 3:
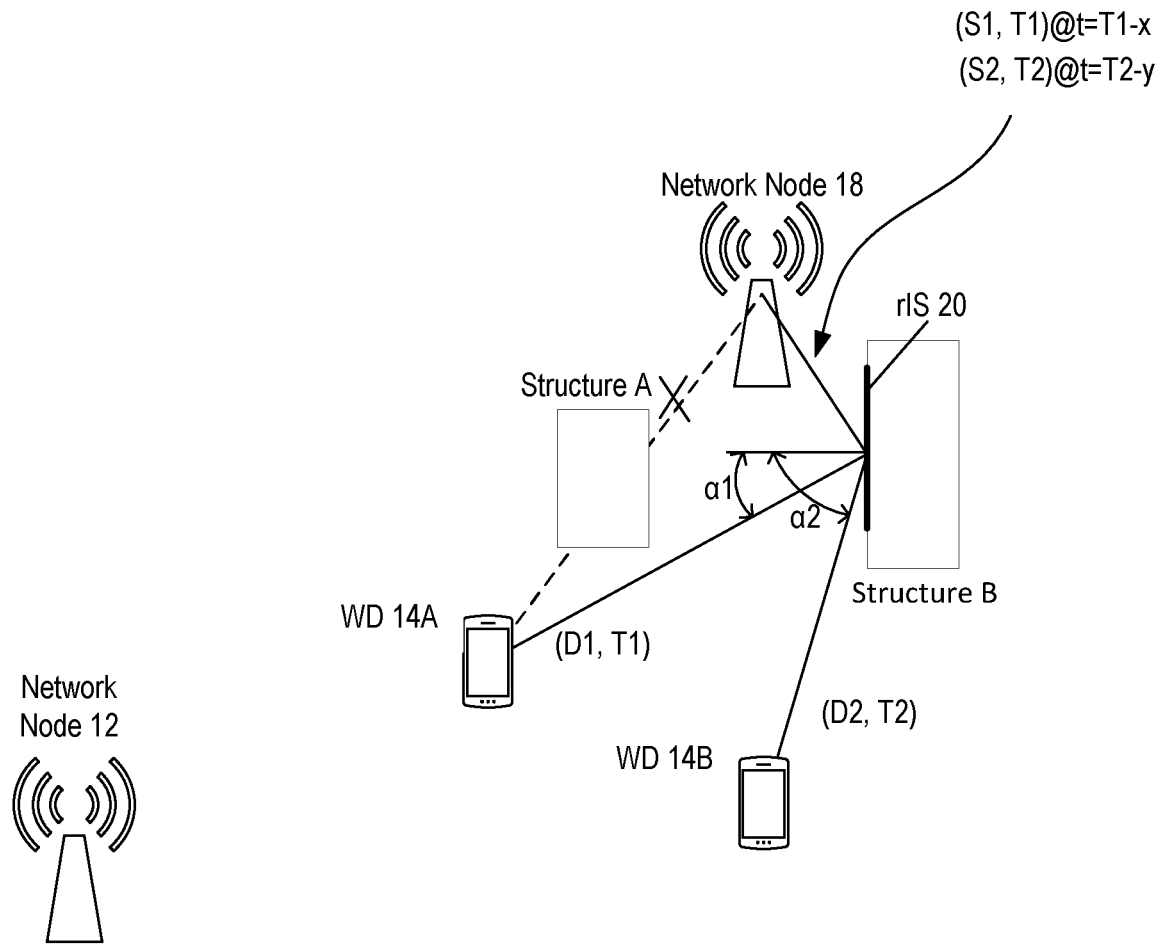
FIG. 3 is an illustration of network node in communication with a reconfigurable reflective surface (rIS) on a control channel.

Referring again to the drawings, FIG. 3 shows a network node 18 in communication with a WD 14 in a scenario where the network node 18 is also in connection with a reconfigurable reflective surface (rIS) 20. In FIG. 3, two WDs 14A and 14B are connected to a network node 18 via an rIS 20 at structure B. Note that WD 14A relies on the rIS 20 at structure B to communicate with the network node 18. In contrast, WD 14B may be in direct LOS communication with the network node 18 and/or may be in communication with network node 18 via the rIS 20 on structure B. Structure B could be a building, for example. Depending on the connection state, the network node 18 may need to know whether the rIS 20 is involved in the connection or not, since, if involved, the network node 18 may control the rIS 20 when communicating with the WDs 14. Thus, for example, the network node 18 may not configure the rIS 20 to reflect to and from the WD 14B when a direct LOS is available between the WD 14B and the network node 18, in some embodiments. This may be done to conserve a bandwidth of the rIS 20 that may be limited by a transverse size of the rIS 20 or by other factors.

In FIG. 3, the network node 18 is in communication with the reconfigurable reflective surface (rIS) 20 on structure B over a first communication link to control a reflection angle of the rIS. The reflection angle may be governed by a formula known as a generalized Snell's law that takes into account the angle of incidence of a wave and yields a unique angle of reflection that may be different from the angle of incidence. In other words, the angle of reflection may be controlled by adjusting impedances behind each patch, in some embodiments. The angle of reflection may depend on the frequency of the uplink and down link signals between the network node 18 and the WDs 14A and 14B. The link that carries control signaling between the rIS 20 at structure B and network node 18 may be, for example, a lower frequency link that, for example, may use sub 6 GHz communication using cellular communication techniques, such as 3G-HSPA, 4G-LTE including NB-IoT, 5G-NR, or that may use non-licensed spectra and technologies, such as used for communications via Wi-Fi, Bluetooth, LoRa etc. Alternatively, the connection between the rIS 20 at structure B and the network node 18 may be a wired connection. In contrast to the first communication link, which transports the control signaling between the network node 18 and the rIS 20, the link between the network node 18 and the WDs 14 via the rIS 20 at structure B is a second communication link. For the second communication link, one or more carrier frequencies of communication between the wireless devices 14 and the network node 18 via the rIS 20 at structure B may be much higher than the frequency of the control channel signaling. The second communication link may be a communication link using mmWave radio frequencies (i.e. 26-300 GHz), for instance. The second communication link may be configured to transport information such as voice data, video data and other content, and may, for example, also include control signaling from the network node 18 to control the WDs 14. For example, in 3GPP Fifth Generation (5G) communications, multiple carriers may be employed in communicating with a single wireless device 14. The frequencies of these carriers may be much higher than the frequency or frequencies used in the control signaling that controls the configurations of the rIS 20 at structure B.

The control signaling from the network node 18 to the rIS 20 at structure B may be used to control the reflection angle for these higher carrier frequencies, and/or to simultaneously control multiple reflection angles at one or more of these higher carrier frequencies. This control signaling may be communicated by medium access control (MAC), radio resource control (RRC) signaling, downlink control information (DCI) or otherwise. In some embodiment the control signalling may be performed on application level (as an "app" implemented in the rIS), and then sent over a data channel to the rIS Furthermore, the control signaling to configure the rIS 20 may be sent on a lower frequency (<6 GHz for example) than the communication with a WD 14 that is taking place on a higher frequency (>20 GHz). The network node 18 may receive configuration information from the rIS 20 and associate one configuration set with each respective wireless device communicating with the network node 18 on the second communication link.

The configuration information may be settings associated to different reflection angles of the rIS 20. In the example of FIG. 3, communication to WD 14A uses the configuration set S1 of the rIS and communication to WD 14B uses the configuration set S2, where S1 and S2 may be associated to two different reflection angles ($\alpha 1$ and $\alpha 2$) needed for respective communication on the second communication link to the respective WDs 14. In one embodiment, the reconfigurable reflective surface 20 includes one or more arrays or matrixes of N passive patch antennas, where each respective antenna has a tunable impedance connected to a ground plane. By controlling the impedances of the respective patch antennas (for example by setting a first set of impedances for angle $\alpha 1$ and by setting a second set of impedances for angle $\alpha 2$), these two reflection angles can be simultaneously realized. In a similar manner, more than two reflection angles can be simultaneously realized. Moreover, the respective patch antennas can be set to reflect signals at multiple frequencies to the same angle of reflection or to different angles of reflection. For example, signals at two carrier frequencies can be reflected at a first angle of reflection and signals at two other carrier frequencies can be reflected at a second angle of reflection, simultaneously.

The network node 18 can determine a need to communicate with a WD 14, e.g., WD 14A and/or WD 14B, each of which may necessitate that rIS 20 use different configuration information to facilitate the communication. For example, once the network node 18 determines a need to communicate (transmit or receive) data (D1) to WD 14A, the network node 18 determines a time instant (T1) for the communication, and, prior to the time instant T1 (T1-$x$) sends configuration information (S1) and time information (T1) to the rIS 20. At T1, the rIS 20 adapts its configuration as specified by S1. At or after T1, the network node 18 may commence communication of the data D1 to the WD 14A. Similar principles hold at time instant T2 for communication of data D2 to WD 14B, as disclosed in FIG. 3. Thus, prior to time instant T2 (T2-$y$), the network node 18 may send configuration information S2 and time information T2 to the rIS 20. At T2, the rIS 20 adapts its configuration as specified by S2. At or after T2, the network node 18 may commence communication of the data D2 to the WD 14B. In some embodiments, the signals carrying D1 and D2 may be reflected in different directions simultaneously or in sequence.

FIG. 4 is a flow chart of an exemplary process in the network node 18 and FIG. 5 is a flow chart of an exemplary process at the reconfigurable reflective surface 20 at structure B. In FIG. 4, the network node 18 obtains a configuration set from the reconfigurable reflective surface 20 (Block S100). The configuration set may include indices that indicate different reflection angle settings of the rIS 20 for reflecting electromagnetic waves at frequencies that may be much higher (mmWave, for example) than frequencies used to control the rIS 20. Hence, configuration set Si is associated to reflection angle $\alpha_i$. The network node 18 then determines a configuration in the configuration set for communication with a particular wireless device 14 in this example (Block S102). This can be done in different ways, for example, by receiving signals from the WD at a time instance where the network node 18 knows the particular rIS 20 setting. For example, the network node 18 may send synchronization signal information at times, T1, T2, ... TN, the synchronization signal information at time Tn causing the rIS 20 to be configured according to a setting Sn at time Tn. At each time Tn, different reflection angles known to the network node 18 are available from a group of settings S of the rIS 20. For each time synchronization signal transmission, there is an associated response slot time (rTi i=(1, N)) (which can be in some embodiments a time slot for Random Access) where a response is expected from a WD 14, allowing time for the WD 14 to determine the synchronization signal content and respond to the network node 18. Thus, the network node 18 may determine a response received at time rTi to be associated with a corresponding rIS 20 setting Si for that WD 14. For further communication with the WD 14, the network node 18 may determine a second resource set allocation (on a second resource/link) and a time $T_n$ for signaling to the WD 14 (Block S104). Prior to this time Tn, on the first resource/link, the determined rIS 20 setting Si is sent to the rIS 20 (Block S106), giving the rIS 20 time to reconfigure according to the setting Si before Tn. Then, at Tn, the network node 18 transmits control/data signaling to the WD 14 on the determined second resource set allocation (Block S108). Note that in some embodiments, the rIS 20 may be set with different settings simultaneously to reflect at multiple angles simultaneously. In some embodiments, different settings may be for different areas of the rIS 20. Depending on which reflected beam the WD 14 receives, the WD 14 may perform a random access (RA) at different times, and the network node 18 can determine which beam the WD is receiving based on the RA time.

rIS Embodiment

In FIG. 5, the rIS 20 sends configuration set information to the network node 18 (Block S110). The rIS 20 receives control signaling from the network node 18 using the first allocated resource(s) (Block S112). The rIS 20 determines a configuration and a time instance t occurring just before time Tn based on the received control signaling (Block114). At time instance t, the rIS 20 applies the determined configuration at the indicated time (Block S116).

Figure 6:
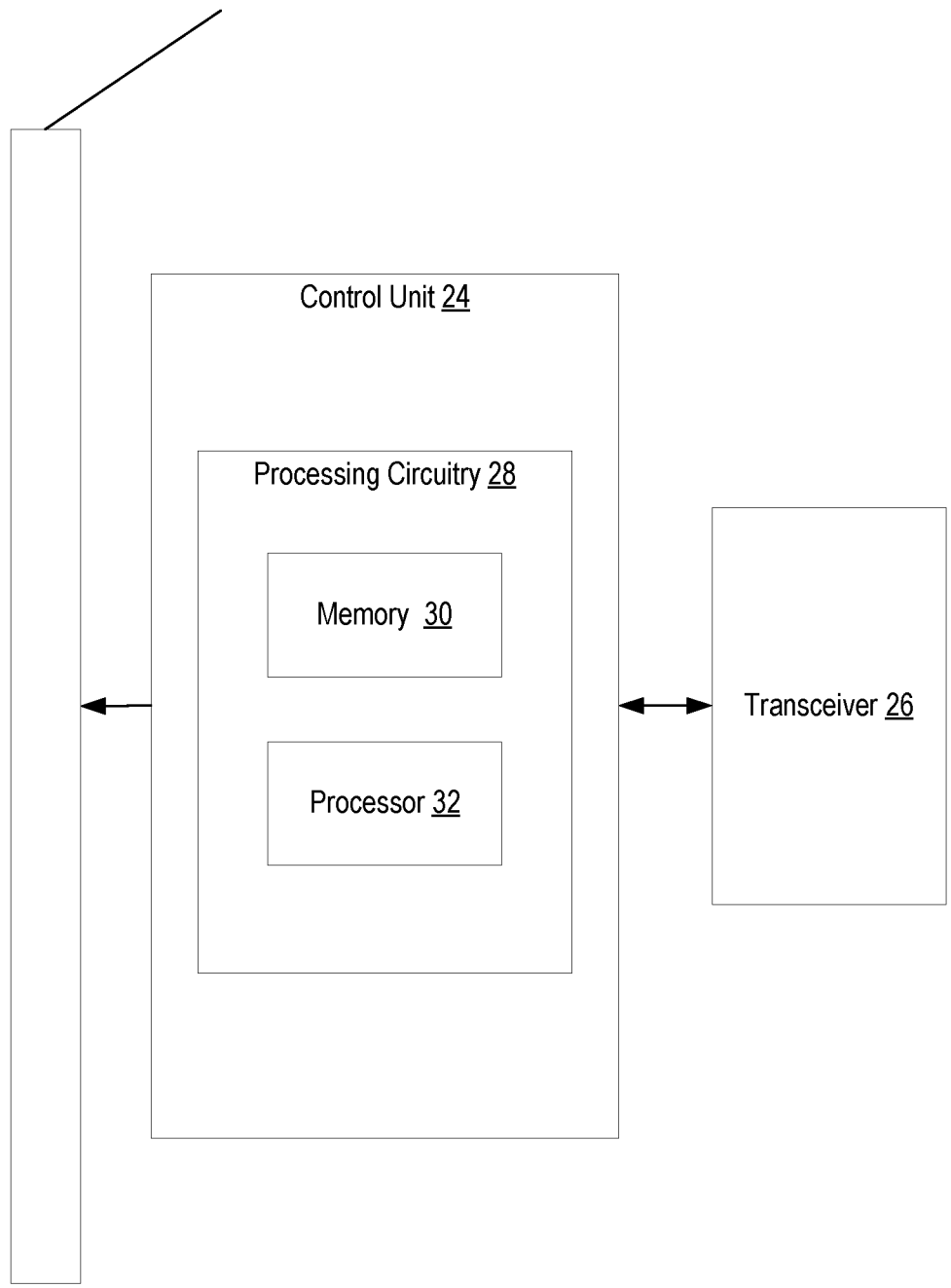
FIG. 6 is a block diagram of an example rIS according to principles set forth herein.

FIG. 6 shows a block diagram of one embodiment of a reconfigurable reflective surface 20. The rIS 20 includes a reflective array. The reconfigurable reflective surface 20 is in communication with an intelligent surface controller 24, which in turn, is in communication with the transceiver 26. Note that in some embodiments, the controller can be located in proximity to the rIS 20 or remote from the rIS 20. The controller 24 may also be referred to as a control unit 24. The transceiver 26 may be conventional and may be configured for wired communication with the network node 18, or may be a wireless communication transceiver. For instance, the transceiver 26 may be a Wi-Fi or Bluetooth compatible transceiver. The transceiver 26 may be a cellular communication modem, or it may be another network node communication unit. The transceiver 26 is configured to forward information received from the network node 18 to the controller 24. As use herein, the term "transceiver" is meant to encompass embodiments where the transmitter and receiver of the transceiver are integrated and embodiments where they are not integrated. For the controller 24 to receive a configuration instruction, for example, from the network node 18, a receiver is used. For the controller 24 to send a current configuration, for example, to the network node 18, a transmitter is used.

The controller 24 is configured to interpret this information to adapt to a specified configuration at time t occurring just before Tn. Each configuration, Sn, may be mapped by the controller 24 to a set of control signals. These control signals may be routed to a set of impedances attached to a set of elements of the rIS 20 in order to cause reflection at one or more desired angles.

The controller 24 may be implemented by processing circuitry 28. The processing circuitry 28 may include memory 30 and a processor 32. In particular, in addition to or instead of a processor, such as a central processing unit, and memory, the processing circuitry 28 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 32 may be configured to access (e.g., write to and/or read from) memory 30, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Processing circuitry 28 may be configured to control and/or implement any of the methods and/or processes described herein and/or to cause such methods, and/or processes to be performed, e.g., by the controller 24. Processor 32 may correspond to one or more processors for performing functions of the controller 24, described herein.

In some embodiments, several reflection coefficients can be configured simultaneously at the rIS 20, via signals from the controller 24 to impedances (or more generally, impedances) of the reconfigurable reflective surface 20, these signals being generated by the controller 24, for certain different sub-spaces of the surfaces. That is, a given rIS 20 installation may be partitioned into sub-spaces. Then the network node 18 can send control signaling to achieve multiple settings (S1, S2, S3, . . . ) specifying multiple respective reflection angles, ($\alpha 1$, $\alpha 2$, $\alpha 3$ . . . ). Then the network node 18 can allocate data transfer to several WDs 14 at different positions at the same time instance, i.e., control signaling (S1, S2, S3, Tn) is sent to the rIS 20.

In some embodiments, the rIS 20 communicates its current configuration to the network node 18, for example, in response to a control signal from the network node 18 instructing the rIS 20 to adapt to a specified configuration. In some embodiments, the rIS 20 communicates its ability or inability to adapt to one or more configuration states. For example, the rIS 20 may communicate information enabling the network node 18 to determine how many simultaneous beams can be reflected from the rIS 20.

Figure 7:
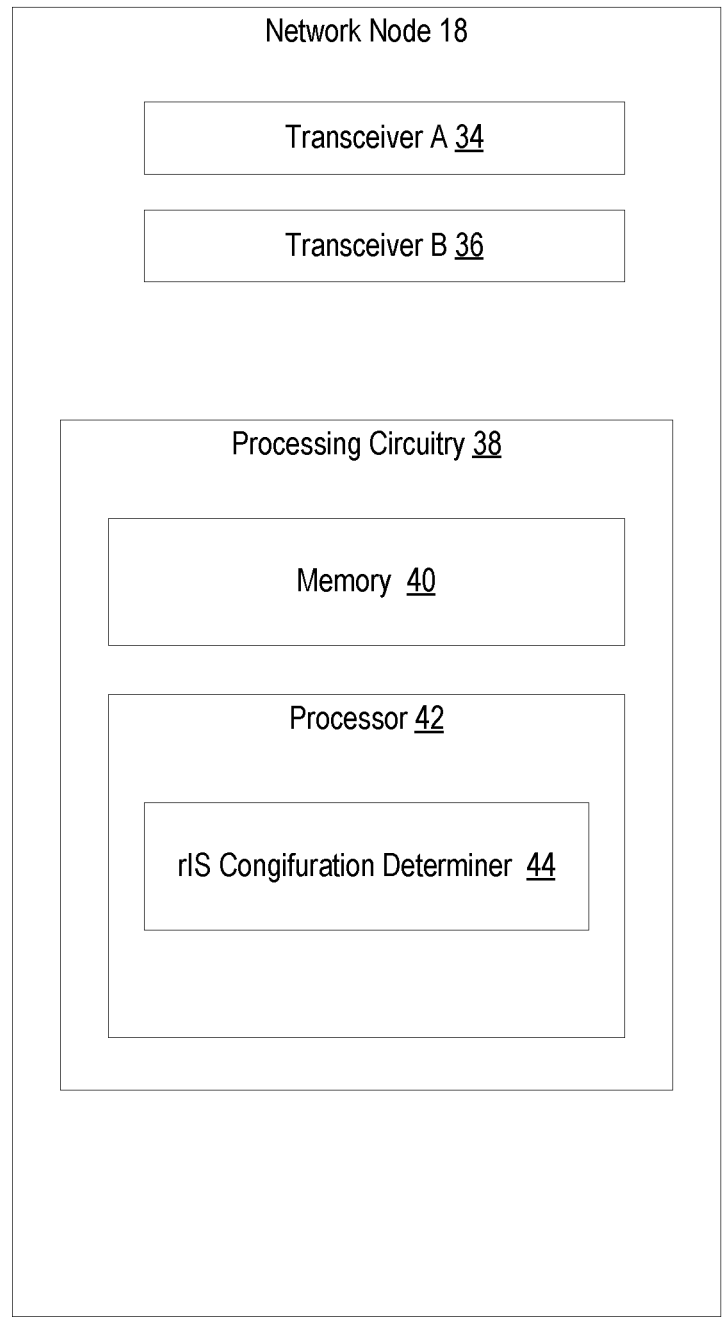
FIG. 7 is a block diagram of an example network node according to principles set forth herein.

FIG. 7 is a block diagram of an example network node 18 configured to communicate with WDs 14 on one set of carriers, and to communicate with the rIS 20 via a separate carrier or set of carriers. Accordingly, the network node 18 has a first transceiver A 34 that is configured to communicate with the WDs 14 on one set of carrier frequencies and has a second transceiver B that is configured to communicate with the reconfigurable reflective surface 20 on one or more frequencies that may be different from the frequencies on which the network node communicates with the WDs 14. For example, transceiver A 34 may transmit to and receive from the WDs on high frequencies (>10 GHz, for example) whereas transceiver B 36 may transmit to and receive from the reconfigurable reflective surface 20 on low frequencies (<6 GHz, for example).

The processing circuitry 38 of the network node 18 may include memory 40 which may be configured to store information indicating available configurations of the rIS 20. For example, the memory 40 may store a codebook or indices of configurations of the rIS 20 and may further store parameters of the rIS 20 such as how many beams are resolvable by the rIS 20 and/or how many different angles of reflection are obtainable by the rIS 20. Accordingly, the processing circuitry 38 may also include a processor 42 configured to execute computer instructions stored in the memory 40. The processor 42 may execute such instructions to implement an rIS configuration determiner 44 which determines a configuration of the rIS 20 to achieve communications with one or more WDs 14. The determined configuration may be signaled to the rIS 20 via the transceiver B 36.

Figure 8:
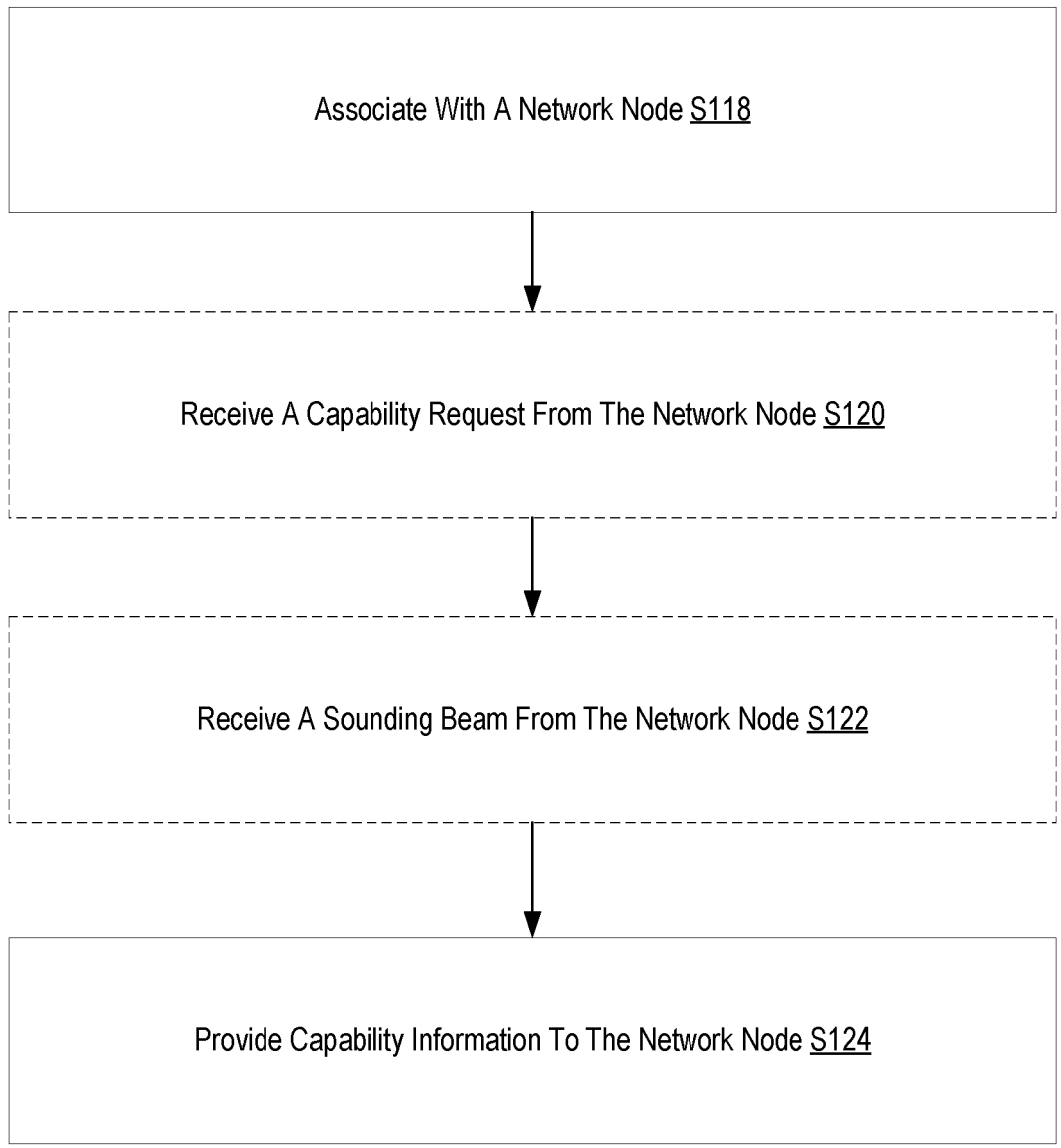
FIG. 8 is flowchart of an exemplary process in the rIS for determining a capability of the rIS, such as a number of beams that can be resolved or reflected by the rIS.

FIG. 8 shows an example method for configuring the rIS 20. The method starts by the rIS 20 associating itself with a preferred network node 18 (Block S118). This association may be made on a first radio resource (for instance a radio resource on a sub 6 GHz carrier frequency). In some embodiments, the rIS 20 receives a capability request from the network node 18 (Block S120). The rIS 20 may also receive a sounding beam from the network node 18 (Block S122). Note that the steps of Blocks S120 and S122 may be optional in some embodiments. The sounding beam may be transmitted at a carrier frequency used for wireless communications with the WD 14, to generate a beam having a representative beam width or a largest beam width at the carrier frequency. The controller 24 may sense a beam width of an incident signal and, knowing the physical extent of the reflective surface 20, send a number to the network node 18 indicating the maximum number of different beams that can be reflected at different angles by the reconfigurable reflective surface 20. This number, along with a maximum angular range of reflection by the reconfigurable reflective surface 20, may be included in the capability information provided to the network node 18 via the transceiver 26 (Block S124). More generally, the capability information includes information that relates to the passive reconfigurable reflective surface capabilities to reflect incoming radio waves on one or more radio resources in different directions according to a generalized Snell's law.

In some embodiments, the associating step (FIG. 8, Block S118) is similar to what is usually performed by a WD in a cellular network, i.e., time and frequency synchronization, determining cell ID of the network node 18, reading master information block (MIB)/system information block (SIB) information, etc. The associating step may also involve informing the network node 18 of the identity and existence of the rIS 20, e.g., through a random access (RA). In some embodiments, the rIS 20 may also provide its capabilities and current configuration state through the same interface or a different interface, e.g., a wired Ethernet connection, as the interface used by the rIS 20 for informing the network node 18 of its identity and existence (Block S124).

In one embodiment, the rIS 20 is requested to provide a capability report. Examples of capabilities for the rIS 20 on the second radio resource may include one or more of:

A number of simultaneous beams the surface can resolve and reflect in different directions;

A number of simultaneous, parallel beams that may be configured between the network node 18 and the rIS 20;

A number and range of reflection angles (resolution);

A number of parallel surfaces (beams);

Reflection angle adjustment time, i.e., the time it takes for the rIS 20 to adapt to a new configuration to set new reflection angles;

Reflection reciprocity, i.e., if reflection is simultaneously unidirectional or bidirectional;

Type: whether the reconfigurable reflective surface 20 is active or passive: if passive, only reflectivity is provided; whereas, if active, there may be transceivers behind every element or less than every element of the reconfigurable reflective surface 20. There may also be a beamformer to provide one or multiple beams. These beams may carry information transmitted or received by the network node 18 that is the same or different from control signaling to/from network node (which may be on a different carrier);

Frequency band (second radio resource) or frequency bandwidth (BW) that is supported by the rIS 20;

Carrier aggregation capabilities, i.e., reflecting multiple carriers simultaneously (both inband and out of band); and Time division duplex (TDD)/frequency division duplex (FDD) limitations. For example, for TDD, the rIS 20 should be able to change configurations faster than the change between uplink and downlink transmission in some embodiments. For FDD, some embodiments may impose a limitation on minimum frequency separation between uplink and downlink. In some embodiments, there may be a difference between a number of WDs 14 supportable on the downlink and a number of WDs 14 supportable on the uplink.

Figure 9:
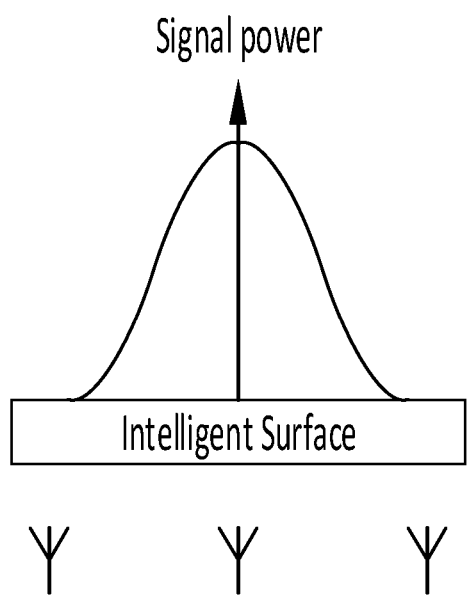
FIG. 9 is an illustration of a broad beam incident on an rIS.
Figure 10:
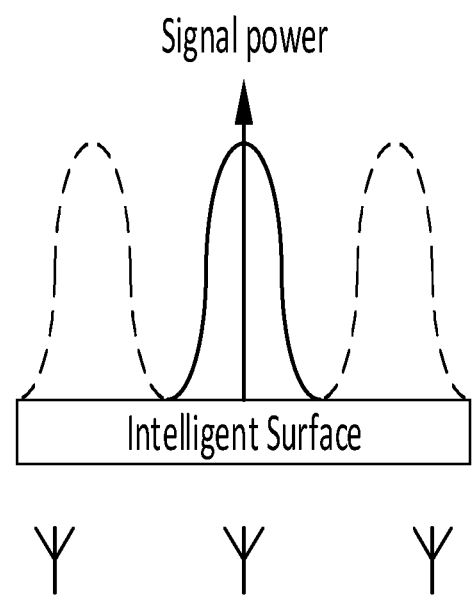
FIG. 10 is an illustration of a narrow beam incident on the rIS and showing that more than one narrow beam can be reflected by the rIS.

In some embodiments, capability signaling may be preceded by receiving a sounding signal on the second radio resource from the network node 18 (Block S120), e.g., to assess the beam width from the network node 18 in relation to the rIS 20 area. With respect to beam width, FIG. 9 shows a broad beam, whereas FIG. 10 shows a narrow beam. In FIG. 10, two extra beams are included (dashed lines), indicating the possibility to fit three beams in parallel. Based on comparison between different received signal strength indicator/reference signal received power (RSSI/RSRP) over the rIS 20, it is possible to determine the number of beams the rIS 20 can resolve. Note that there may be unknown external parameters that may influence the result, e.g., number of antennas at the network node 18, distance to the network node 18, etc. Upon receiving the sounding wave, the rIS 20 may then return either the measured RSSI/RSRP data or an assessment of the number of parallel beams it can support. Thus, in some embodiments, this number of parallel beams may be computed in the processing circuitry 28 of the controller 24. In addition, or in the alternative, the number of parallel beams supported by the rIS 20 may be computed in the network node 18.

In an alternative embodiment, the sounding wave may instead be used for determining, via the processing circuitry 28, a time of arrival (ToA) at the rIS 20, and transmitting the determined ToA to the network node 18. Upon receiving such information, the network node 18 can determine the number of parallel beams resolvable by the rIS 20, based on knowledge about the number and orientation of antennas at the network node 18, assuming LoS or near-LoS conditions.

Figure 11:
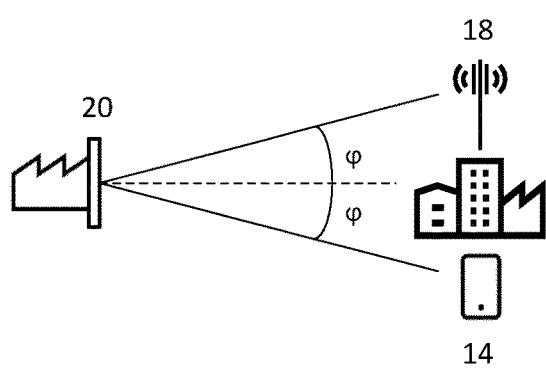
FIG. 11 illustrates an rIS that with a zero tilt angle.
Figure 12:
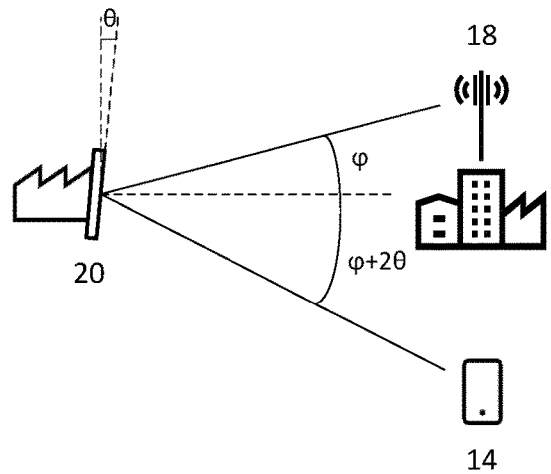
FIG. 12 illustrates an rIS with a non-zero tilt angle and its effect upon the angle of reflection.

Some embodiments provide a method in the rIS 20 controller 24 for determining the preferred reflection for LoS communications between a network node 18 and a wireless device 14 (or another network node, for example). The method is based on the assumption that the reconfigurable reflective surface 20 and the network node 18 have fixed positions whereas a wireless device is mobile. Hence, the direction between the rIS 20 and the network node 18 does not change, whereas the direction between the rIS 20 and the wireless device 14 may change as the WD 14 moves. Hence, only the direction between the rIS 20 and the WD 14 may be needed to determine the preferred reflection angle. The network node 18 is not needed to determine the preferred reflection angle for a WD 14. FIGS. 11 and 12 show two different scenarios, side by side, of using an rIS 20 to reflect signals from a network node 18 to a WD 14. In FIG. 11 there is no tilt in the rIS 20, whereas in FIG. 12 there is tilt at angle θ relative to an axis. It should be noted that the tilting may be performed electronically such that only the properties of the surface appear to be tilted.

To determine the preferred reflection angle at the rIS 20, a process may be followed. First, an angle of arrival of a beam from the network node 18 to the rIS 20 is determined. This information may be read from a file, determined by signaling or measured by sensing a signal distribution at the reconfigurable reflective surface 20. In a second step, the reconfigurable reflective surface 20 receives a signal from the wireless device 14 using a receive antenna that may be part of the transceiver 26 or may be altogether separate from the transceiver 26. In this step, the main task is to determine the direction to the wireless device 14, and that can be done by wireless communication from the wireless device at an angle that is not necessarily the same as the reflective angle for which the rIS 20 is configured. In a third step, parameters for the rIS 20 are determined to establish communication between the wireless device 14 and the network node 18 to which the rIS 20 is associated. Thereby, the surface will act as a reflector or pseudo-mirror such that radio signals transmitted from the device will be reflected at the surface and reach the network node 18, and vice versa, i.e., a pseudo line of sight channel has been established.

In some embodiments, the angle of arrival from the WD 14 is determined at the rIS 20 and is used for determining a reflection angle for the rIS 20. When the rIS 20 is configured with the determined reflection angle, it will provide pseudo-line of sight communications between the WD 14 and the network node 18.

In another embodiment, the reflection angle can be used to determine a preferred subset of the surface to use for communications between the WD 14 and the network node 18. Assume the rIS 20 has a matrix of surfaces and may hence be partitioned into sub-surfaces, where each subsurface may serve a different device. In some embodiments, each subsurface is associated with a set of reflective array elements that is less than all available reflective array elements. In one embodiment, the subsurface is selected such that it gives a smallest tilt compared to the "zero-tilt" in the surface for the pseudo-LoS channel. In another embodiment, the subsurface is selected such that the resulting tilt is below a maximum tilt that the subsurface is able to provide. In some embodiments, the configuration is limited to the subsurface used for the specific WD 14.

As noted above, in some embodiments, a signal is received at the rIS 20 on a first frequency to control the configuration of the surface, whereas the surface is configured for using a second frequency. As mention previously, the transmission technology may differ, e.g., IEEE 802.11 or 3GPP 5G-NR may be used. It is straightforward to translate the AoA of such a system to the one used by the reconfigurable reflective surface 20, which may preferably be passive.

Figure 13:
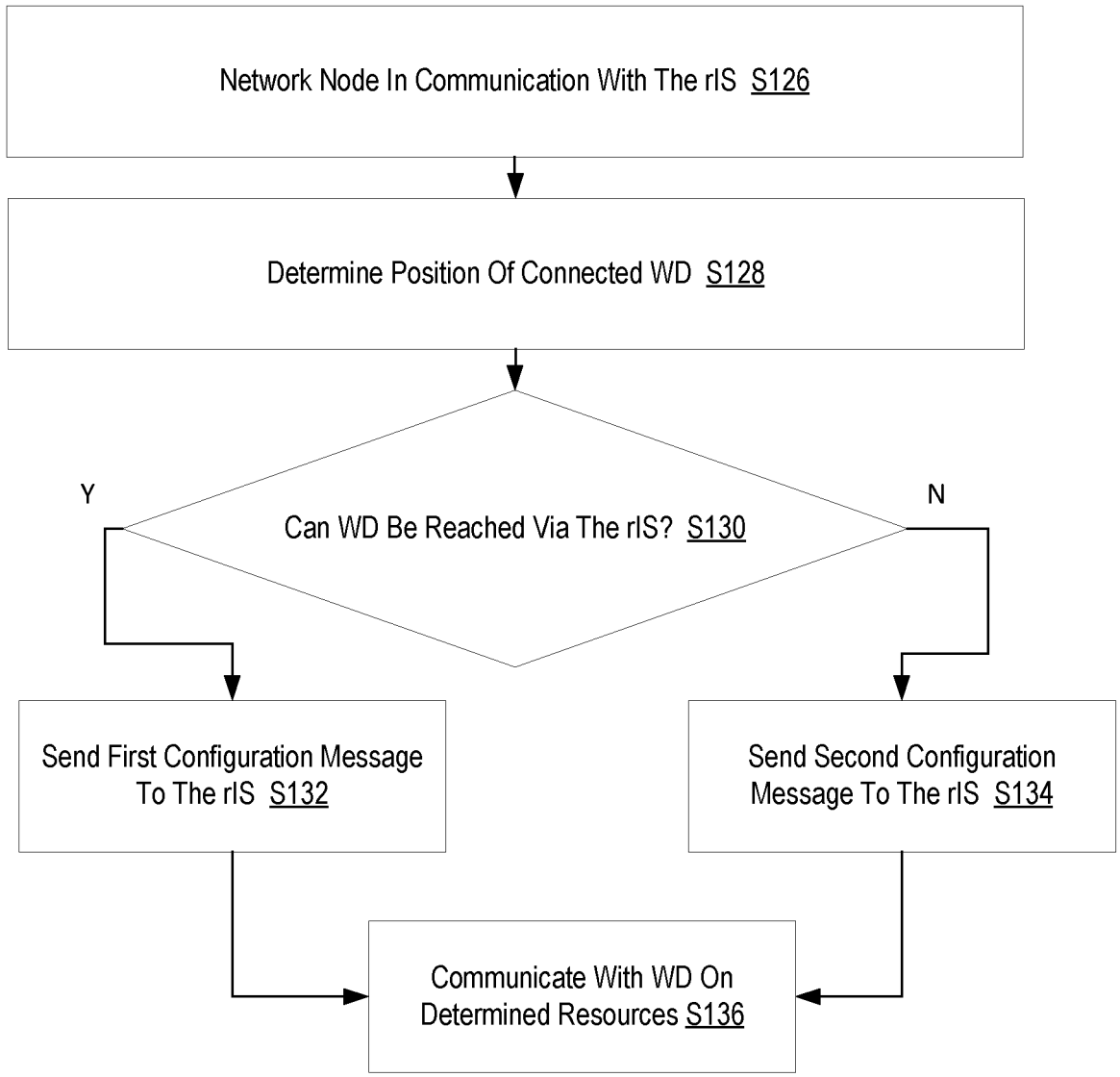
FIG. 13 is flowchart of an exemplary process in a network node for determining a configuration and mode of operation for an rIS.

According to one aspect, a network node 18 for control signaling to a passive reconfigurable reflective surface 20 configured for communication on a second radio resource to a wireless device is provided. A method in such a network node 18 includes obtaining a configuration set for the passive reconfigurable reflective surface 20, determining a configuration in the configuration set associated to communication with a wireless device on the second radio resource, determining a resource set on the second radio resource to be used for communication with the wireless device, signaling on a first resource, to the passive reconfigurable reflective surface 20, the determined configuration and resource set combination applicable for communication with the wireless device, and transmitting data to the wireless device according to the determined resource sets on the second radio resource FIG. 13 is a flow chart of an exemplary process in a network node 18 according to principles set forth herein. The network node 18 is in connection with a reconfigurable reflective surface (rIS) 20 (Block S126). The connection may be considered a control channel where the network node 18 and the rIS 20 can exchange information such as configuration capability information from the rIS 20 to the network node 18. The network node 18 can control the configuration of reflection angles the rIS 20 should use at certain time instants. Furthermore, position information of the rIS 20 is known by the network node 18. The network node 18 determines a position of a connected WD 14 (Block S128). In one example embodiment, the WD 14 transmits position information to the network node 18 on one or more carrier frequencies designated for communications between the WD 14 and the network node 18. In another embodiment, the network node 18 may receive a measurement (RSRP/RSSI, for example) report from the WD 14 and by that information determines the position/location of the WD 14. In other examples, time of arrival (ToA) measurements of radio signals to and from a WD 14 may be used to determine the location of the WD 14. In some embodiments, the rIS 20 is an active rIS. In some embodiments, the rIS 20 may inform the network node 18 about WD position, WD RSRP/RSSI, etc., as determined at the rIS 20. Based on the location of the WD 14, the network node position and the rIS location, the network node 18 determines whether the WD 14 is connected to the network node 18 directly or via the rIS 20 (Block S130). Angle of Arrival (AoA) and beam preference information may also be used to determine the location of the WD 14.

When WD 14 is connected via rIS 20 to the network node 18, the network node 18 determines the configuration used by the rIS 20 at the time of the WD location determination. The configuration information may be the reflection angle used by the rIS 20 at the time of WD location determination. Hence, in some embodiments, the reflection angle is selected by the network node 18 to communicate with the WD 14 via the rIS 20. Furthermore, in some embodiments, the network node 18 may send a first message configuring the rIS 20 in a first mode (Block S132) prior to when the network node 18 communicates with the WD 14 (Block S136). The first mode of operation may be that the rIS 20 is configured with a reflection angle so that the communication between the WD 14 and network node 18 can take place at the first time instant.

In cases where the WD 14 is connected directly to the network node 18, the network node 18 may, prior to a first time instance, optionally send a second message to the rIS 20 to configure the rIS 20 into a second default mode of operation (Block S136). The second default mode of operation may be one of:

Disabled mode: the rIS 20 may set the reflection in a default mode to reduce possible interference;

Idle mode: a standby mode where the rIS 20 awaits new control information form the network node 18; or Update mode: the rIS 20 updates information about its state and angular information for each of a plurality of WDs that can be reached (which, in an active array, may scan for WDs and/or update location information for WDs). At some later time instance, the network node 18 may communicate with the WD 14 (Block S136). The communication may be uplink and/or downlink.

According to one aspect, a method in a passive reconfigurable reflective surface 20 for reflection capability signaling on a first radio resource to a network node 18 to control reflection of signaling on a second radio resource between the network node 18 and at least one wireless device 14 is provided. The method includes associating with a network node 18 and signaling capabilities of a preferably passive reconfigurable reflective surface 20.

According to this aspect, in some embodiments, the network node 18 performs time/frequency synchronization and at least a random access towards the network node 18 on a first radio resource. In some embodiments, a capability value is determined by receiving a sounding signal from the network node 18 on a second radio resource. In some embodiments, the received sounding signal is a narrow beam signal and the beam power distribution over the extent of the rIS 20, determines a number of simultaneous beams the rIS 20 can resolve. The determined number may be a minimum number in some embodiments. In some embodiments, reflection capabilities of the rIS 20 may include at least one of the following:

a. A number of simultaneous beams to reflect on the second radio resource;
b. Beam resolution: an ability to resolve closely spaced beams;
c. Frequency band: the frequency response of the rIS 20 surrounding the second radio resource;
d. Number of reflection angles and angular range of the rIS 20;
e. Number of parallel surfaces (beams);
f. Reflection angle adjustment time;
g. Carrier aggregation capabilities: the ability to reflect at all carriers of a carrier aggregated communication;
h. Type: active/passive, i.e., having capability of transmission and reflections (active) or only reflection (passive);
i. TDD/FDD limitations; and
j. Reflection reciprocity.

In some embodiments, the first radio resource is sub 6 GHz and the second radio resource is at mmW frequencies.

According to another aspect, a network node 18 in communication with a reconfigurable reflective surface (rIS 20) is configured to determine whether a connection to the WD 14 may be direct or via the rIS 20. If communication is via the rIS 20, then in a first mode of operation and prior to communicating with the WD 14, the network node 18 sends a first message to the rIS 20 instructing the rIS 20 to use a particular configuration at a time of locating the WD 14. In some embodiments, a second message from the network node 18 configures the rIS 20 in a default mode such as disabled mode, idle mode, and update mode. In idle mode, the rIS 20 listens for new control information from the network node 18 or the WD 14. In some embodiments, the WD 14 could query the availability of the rIS 20. In update mode, the rIS 20 may actively try to locate new WDs 14 or update location of a WD 14. The locating can be based on GPS, in some embodiments.

FIG. 14 is a flowchart of an exemplary process in a network node 18 configured to communicate with a wireless device (WD) 14 via a reconfigurable reflective surface 20, the reconfigurable reflective surface 20 being controllable by a controller 24 and being applied to a structure to controllably reflect signals exchanged between the network node and the WD 14. The process includes determining, via the rIS configuration determiner 44 of the processing circuitry 38 of the network node 18, a configuration of the reconfigurable reflective surface 20 associated with the WD 14, the determined configuration being associated with a particular reflection coefficient (Block S138). The process also includes transmitting, via the transceiver B 36, to the controller 24 of the reconfigurable reflective surface 20, an indication of the determined configuration (Block S140), and receiving, via the transceiver A 34, signals from the WD 14 at least partially via reflection at the reconfigurable reflective surface 20 (Block S142).

Figure 15:
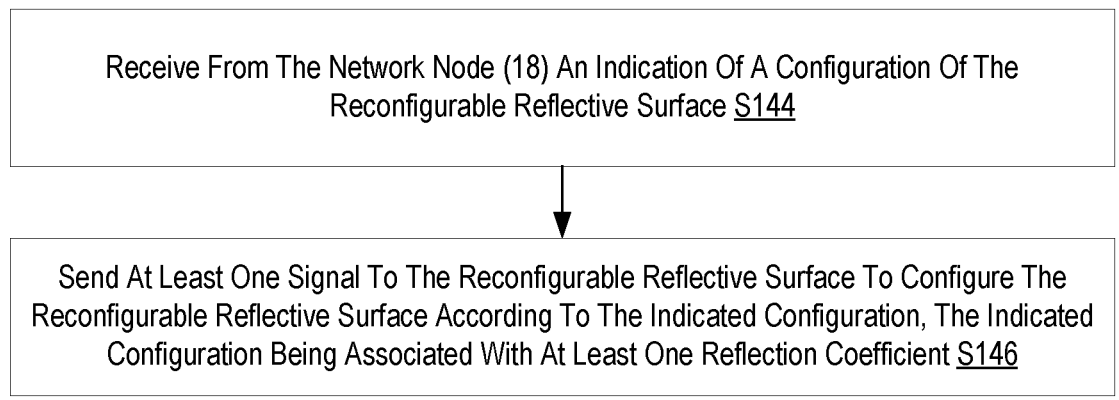
FIG. 15 is a flowchart of an exemplary process in a controller of an rIS according to principles set forth herein.

FIG. 15 is a flowchart of an exemplary process in a controller 24 in communication with a reconfigurable reflective surface 20 applied to a structure is provided, where the controller 24 is configured to communicate with a network node 18. The process includes receiving, via a transceiver 26, from the network node 18, an indication of a configuration of the reconfigurable reflective surface 20 (Block S144), and sending, via the transceiver 26, at least one signal to the reconfigurable reflective surface 20 to configure the reconfigurable reflective surface 20 according to the indicated configuration, the indicated configuration being associated with at least one reflection coefficient (Block S146).

According to one aspect, a network node 18 is configured to communicate with a wireless device, WD 14, via a reconfigurable reflective surface 20, the reconfigurable reflective surface 20 being controllable by a controller 24 to controllably reflect signals exchanged between the network node 18 and the WD 14. The network node 18 includes processing circuitry 38 configured to determine a configuration of the reconfigurable reflective surface 20 associated with the WD 14, the determined configuration being associated with a particular reflection coefficient. The network node 18 also includes at least one transceiver 36 in communication with the processing circuitry 38, the at least one transceiver 36 being configured to transmit to the controller 24 of the reconfigurable reflective surface 20, an indication of the determined configuration. The network node 18 may also include another transceiver 34 configured to receive signals from the WD 14 and transmit signals to the WD 14 at least partially via reflection at the reconfigurable reflective surface 20.

According to this aspect, in some embodiments, the transmitting to the controller 24 is at one frequency different from a frequency of signals transmitted to the WD 14. In some embodiments, the determined configuration is selected from a set of predetermined configurations, each configuration in the set being associated with a particular reflection coefficient at a time of the selecting. In some embodiments, the processing circuitry 38 is further configured to update the determining of the configuration periodically to account for movement of the WD 14, the updating being performed at a rate that is based at least in part on a rate of movement of the WD 14. In some embodiments, the determining of the configuration is based at least in part on selecting a configuration that results in a greatest improvement of throughput between the WD 14 and the network node 18 as compared to other configurations of the reconfigurable reflective surface 20. In some embodiments, the determining of the configuration is based at least in part on a previously determined configuration of the reconfigurable reflective surface 20. In some embodiments, the at least one transceiver 36 is further configured to receive a capability report from the reconfigurable reflective surface 20, the capability report indicating a number of beams the reconfigurable reflective surface 20 can resolve and reflect in different directions. In some embodiments, the capability report includes a number of reflection angles by which the reconfigurable reflective surface 20 can simultaneously reflect signals incident upon the reconfigurable reflective surface 20. In some embodiments, the at least one transceiver 36 is further configured to transmit a sounding signal receivable by the reconfigurable reflective surface 20 to enable the controller 24 to determine a beam width of the sounding signal. In some embodiments, the at least one transceiver 36 is further configured to receive from the controller 24 a time of arrival of the sounding signal at the reconfigurable reflective surface 20. In some embodiments, the processing circuitry 38 is further configured to determine a number of beams that can be separately reflected at different angles by the reconfigurable reflective surface 20. In some embodiments, the determining of the configuration of the reconfigurable reflective surface 20 is based at least in part on signaling received from the WD 14 during a time when the reconfigurable reflective surface 20 is configured with a configuration known to the network node 18. In some embodiments, the processing circuitry 38 is further configured to switch between use and non-use of the reconfigurable reflective surface 20 based at least in part on a comparison of a strength of the signals received from the WD 14 with and without directing a beam to the WD 14 via the reconfigurable reflective surface 20. In some embodiments, the at least one transceiver 36 transmits a command directing the reconfigurable reflective surface 20 to reconfigure to: a disabled mode in which the reconfigurable reflective surface 20 is set to a default configuration; an idle mode in which the reconfigurable reflective surface 20 awaits a next control signal from the network node 18; or an update mode in which the reconfigurable reflective surface 20 reconfigures to a next configuration. In some embodiments, the determining of the configuration is based at least in part on an angle of arrival from the WD 14 to the reconfigurable reflective surface 20. In some embodiments, another transceiver 34 is configured to transmit a signal instructing the WD 14 to direct a beam to the reconfigurable reflective surface 20. In some embodiments, the determined configuration is selected based on a pilot signal received from the WD 14.

According to another aspect, a method is implemented in a network node 18 configured to communicate with a wireless device (WD) via a reconfigurable reflective surface 20, the reconfigurable reflective surface 20 being controllable by a controller 24 and being applied to a structure to controllably reflect signals exchanged between the network node 18 and the WD 14. The method includes determining, via the processing circuitry 38, a configuration of the reconfigurable reflective surface 20 associated with the WD 14, the determined configuration being associated with a particular reflection coefficient. The method also includes transmitting, via the transceiver 36 to the controller 24 of the reconfigurable reflective surface 20, an indication of the determined configuration, and receiving, via the transceiver 34, signals from the WD 14 at least partially via reflection at the reconfigurable reflective surface 20.

According to this aspect, in some embodiments, the transmitting to the controller 24 is at one frequency different from a frequency of signals transmitted to the WD 14. In some embodiments, the determined configuration is selected from a set of predetermined configurations, each configuration in the set being associated with a particular reflection coefficient at a time of the selecting. In some embodiments, the method further includes updating, via the processing circuitry 38, the determining of the configuration periodically to account for movement of the WD 14, the updating being performed at a rate that is based at least in part on a rate of movement of the WD 14. In some embodiments, the determining of the configuration is based at least in part on selecting a configuration that results in a greatest improvement of throughput between the WD 14 and the network node 18 as compared to other configurations of the reconfigurable reflective surface 20. In some embodiments, the determining of the configuration is based at least in part on a previously determined configuration of the reconfigurable reflective surface 20. In some embodiments, the method further includes receiving, via the transceiver 36, a capability report from the reconfigurable reflective surface 20, the capability report indicating a number of beams the reconfigurable reflective surface 20 can resolve and reflect in different directions. In some embodiments, the capability report includes a number of reflection angles by which the reconfigurable reflective surface 20 can simultaneously reflect signals incident upon the reconfigurable reflective surface 20. In some embodiments, the method further includes transmitting, via the transceiver 36, a sounding signal receivable by the reconfigurable reflective surface 20 to enable the controller 24 to determine a beam property of the sounding signal. In some embodiments, the method also includes receiving, via the transceiver 36, from the controller 24 a time of arrival of the sounding signal at the reconfigurable reflective surface 20. In some embodiments, the method also includes determining a number of beams that can be separately reflected at different angles by the reconfigurable reflective surface 20. In some embodiments, the determining of the configuration of the reconfigurable reflective surface 20 is based at least in part on signaling received from the WD 14 during a time when the reconfigurable reflective surface 20 is configured with a configuration known to the network node 18. In some embodiments, the method further includes switching, via the processing circuitry 38, between use and non-use of the reconfigurable reflective surface 20 based at least in part on a comparison of a strength of the signals received via the transceiver 36 from the WD 14 with and without directing a beam to the WD 14 via the reconfigurable reflective surface 20. In some embodiments, the method further includes transmitting, via the transceiver 36, a command directing the reconfigurable reflective surface 20 to reconfigure to a disabled mode in which the reconfigurable reflective surface 20 is set to a default configuration, an idle mode in which the reconfigurable reflective surface 20 awaits a next control signal from the network node 18, or an update mode in which the reconfigurable reflective surface 20 reconfigures to a next configuration. In some embodiments, the determining of the configuration is based at least in part on an angle of arrival from the WD 14 to the reconfigurable reflective surface 20. In some embodiments, the transceiver 36 is configured to transmit a signal instructing the WD 14 to direct a beam to the reconfigurable reflective surface 20. In some embodiments, the determined configuration is selected based on a pilot signal received from the WD 14.

According to yet another aspect, a controller 24 in communication with a reconfigurable reflective surface 20 is configured to communicate with a network node 18. The controller 24 includes a transceiver 26 configured to receive from the network node 18 an indication of a configuration of the reconfigurable reflective surface 20. The controller 24 also includes processing circuitry 28 in communication with the transceiver 26, the processing circuitry 28 configured to cause the transceiver 26 to transmit at least one signal to the reconfigurable reflective surface 20 to configure the reconfigurable reflective surface 20 according to the indicated configuration, the indicated configuration being associated with at least one reflection coefficient.

According to this aspect, in some embodiments, the controller 24 is in proximity to the reconfigurable reflective surface 20. In some embodiments, the transceiver 26 is further configured to receive an indication of a configuration of the reconfigurable reflective surface 20 periodically at a rate determined by the network node 18. In some embodiments, the transceiver 26 is further configured to report a current configuration of the reconfigurable reflective surface 20 in response to a query from the network node 18. In some embodiments, the transceiver 26 is further configured to indicate a number of beams resolvable by the reconfigurable reflective surface 20. In some embodiments, the transceiver 26 is further configured to receive a sounding signal from the network node 18, and the processing circuitry 28 is further configured to determine a beam property of the sounding signal. In some embodiments, the processing circuitry 28 is further configured to determine a time of arrival of the sounding signal, and the transceiver 26 is further configured to transmit the time of arrival to the network node 18. In some embodiments, the processing circuitry 28 is further configured to determine a number of beams that the reconfigurable reflective surface 20 can resolve based at least in part on a received strength of the sounding signal. In some embodiments, the processing circuitry 28 is further configured to determine a number of beams that can be separately reflected at different angles by the reconfigurable reflective surface 20. In some embodiments, the processing circuitry 28 is further configured to determine a number of reflection angles that can be resolved by the reconfigurable reflective surface 20. In some embodiments, the processing circuitry 28 is further configured to control a plurality of reconfigurable reflective surfaces 20 oriented in layers. In some embodiments, the processing circuitry 28 is further configured to configure the reconfigurable reflective surface 20 20 to reflect multiple carriers at a same angle of reflection. In some embodiments, the processing circuitry 28 is further configured to configure an active reconfigurable reflective surface 20. In some embodiments, the processing circuitry 28 is further configured to configure the reconfigurable reflective surface 20 to operate in one of a time division duplex mode and a frequency division duplex mode.

According to another aspect, a method in a controller 24 in communication with a reconfigurable reflective surface 20 applied to a structure is provided, where the controller 24 is configured to communicate with a network node 18. The method includes receiving from the network node 18 an indication of a configuration of the reconfigurable reflective surface 20, and sending at least one signal to the reconfigurable reflective surface 20 to configure the reconfigurable reflective surface 20 according to the indicated configuration, the indicated configuration being associated with at least one reflection coefficient.

According to this aspect, in some embodiments, the controller 24 is in proximity to the reconfigurable reflective surface 20. In some embodiments, the method further includes receiving, via the transceiver 26, an indication of a configuration of the reconfigurable reflective surface 20 periodically at a rate determined by the network node 18. In some embodiments, the method further includes reporting, via the transceiver 26, a current configuration of the reconfigurable reflective surface 20 in response to a query from the network node 18. In some embodiments, the method further includes indicating a number of beams resolvable by the reconfigurable reflective surface 20. In some embodiments, the method also includes receiving, via the transceiver 26, a sounding signal from the network node 18 and determining a beam width of the sounding signal. In some embodiments, the method also includes determining, via the processing circuitry 28, a time of arrival of the sounding signal and transmitting, via the transceiver 26, the time of arrival to the network node 18. In some embodiments, the method also includes determining a number of beams that the reconfigurable reflective surface 20 can resolve based at least in part on a received strength of the sounding signal. In some embodiments, the method also includes determining, via the processing circuitry 28, a number of beams that can be separately reflected at different angles by the reconfigurable reflective surface 20. In some embodiments, the method further includes determining a number of reflection angles that can be resolved by the reconfigurable reflective surface 20. In some embodiments, the method further includes controlling, via the processing circuitry 28, a plurality of reconfigurable reflective surfaces 20 oriented in layers. In some embodiments, the method further includes configuring, via the processing circuitry 28, the reconfigurable reflective surface 20 to reflect multiple carriers at a same angle of reflection. In some embodiments, the method further includes configuring, via the processing circuitry 28, an active reconfigurable reflective surface 20. In some embodiments, the method further incudes configuring, via the processing circuitry 28, the reconfigurable reflective surface 20 to operate in one of a time division duplex mode and a frequency division duplex mode.

As will be appreciated by one of skill in the art, the concepts described herein may be embodied as a method, data processing system, and/or computer program product. Accordingly, the concepts described herein may take the form of an entirely hardware embodiment, an entirely software embodiment or an embodiment combining software and hardware aspects all generally referred to herein as a "circuit" or "module." Furthermore, the disclosure may take the form of a computer program product on a tangible computer usable storage medium having computer program code embodied in the medium that can be executed by a computer. Any suitable tangible computer readable medium may be utilized including hard disks, CD-ROMs, electronic storage devices, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory or storage medium that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object oriented programming language such as Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

It will be appreciated by persons skilled in the art that the embodiments described herein are not limited to what has been particularly shown and described herein above. In addition, unless mention was made above to the contrary, it should be noted that all of the accompanying drawings are not to scale. A variety of modifications and variations are possible in light of the above teachings without departing from the scope of the following claims.

The invention claimed is:

1. A network node configured to communicate with a wireless device, WD, via a reconfigurable reflective surface, the reconfigurable reflective surface being controllable by a controller to controllably reflect signals exchanged between the network node and the WD, the network node comprising:

processing circuitry configured to:
determine a configuration of the reconfigurable reflective surface associated with the WD, the determined configuration being associated with a particular reflection coefficient; and
at least one transceiver in communication with the processing circuitry, the at least one transceiver being configured to:
transmit a sounding beam at a carrier frequency to the reconfigurable reflective surface causing the controller to determine a configuration capability of the reconfigurable reflective surface at the carrier frequency for reflecting incoming radio waves from the network node;
receive capability information from the controller indicating the configuration capability of the reconfigurable reflective surface at the carrier frequency;
the processing circuitry being further configured to:
select a configuration of the reconfigurable reflective surface based on the capability information;
the transceiver being further configured to:
transmit to the controller of the reconfigurable reflective surface, an indication of the determined configuration comprising a configuration message to the controller causing the controller to configure the reconfigurable reflective surface with the selected configuration; and
receive signals from the WD and transmit signals to the WD at least partially via reflection at the reconfigurable reflective surface at the carrier frequency configured with the selected configuration.

2. A method in a network node configured to communicate with a wireless device, WD, via a reconfigurable reflective surface, the reconfigurable reflective surface being controllable by a controller to controllably reflect signals exchanged between the network node and the WD, the method comprising:
determining a configuration of the reconfigurable reflective surface associated with the WD, the determined configuration being associated with a particular reflection coefficient;
transmitting a sounding beam at a carrier frequency to the reconfigurable reflective surface causing the controller to determine a configuration capability of the reconfigurable reflective surface at the carrier frequency for reflecting incoming radio waves from the network node;
receiving capability information from the controller indicating the configuration capability of the reconfigurable reflective surface at the carrier frequency;
selecting a configuration of the reconfigurable reflective surface based on the capability information;
transmitting to the controller of the reconfigurable reflective surface, an indication of the determined configuration comprising a configuration message to the controller causing the controller to configure the reconfigurable reflective surface with the selected configuration; and
receiving signals from the WD at least partially via reflection at the reconfigurable reflective surface at the carrier frequency configured with the selected configuration.

3. The method of claim 2, wherein the transmitting to the controller is at one frequency different from a frequency of signals transmitted to the WD.

4. The method of claim 2, wherein the determined configuration is selected from a set of predetermined configurations, each configuration in the set being associated with a particular reflection coefficient at a time of the selecting.

5. The method of claim 2, further comprising updating the determining of the configuration periodically to account for movement of the WD, the updating being performed at a rate that is based at least in part on a rate of movement of the WD.

6. The method of claim 2, wherein the determining of the configuration is based at least in part on selecting a configuration that results in a greatest improvement of throughput between the WD and the network node as compared to other configurations of the reconfigurable reflective surface.

7. The method of claim 6, wherein the determining of the configuration is based at least in part on a previously determined configuration of the reconfigurable reflective surface.

8. The method of claim 2, further comprising receiving a capability report from the reconfigurable reflective surface, the capability report indicating a number of beams the reconfigurable reflective surface can resolve and reflect in different directions.

9. The method of claim 8, wherein the capability report includes a number of reflection angles by which the reconfigurable reflective surface can simultaneously reflect signals incident upon the reconfigurable reflective surface.

10. The method of claim 2, further comprising determining a number of beams that can be separately reflected at different angles by the reconfigurable reflective surface.

11. The method of claim 2, wherein the determining of the configuration of the reconfigurable reflective surface is based at least in part on signaling received from the WD during a time when the reconfigurable reflective surface is configured with a configuration known to the network node.

12. The method of claim 2, further comprising switching between use and non-use of the reconfigurable reflective surface based at least in part on a comparison of a strength of the signals received from the WD with and without directing a beam to the WD via the reconfigurable reflective surface.

13. The method of claim 2, further comprising transmitting a command directing the reconfigurable reflective surface to reconfigure to one of:
a disabled mode in which the reconfigurable reflective surface is set to a default configuration;
an idle mode in which the reconfigurable reflective surface awaits a next control signal from the network node; or
an update mode in which the reconfigurable reflective surface reconfigures to a next configuration.

14. The method of claim 2, wherein the determining of the configuration is based at least in part on an angle of arrival from the WD to the reconfigurable reflective surface.

15. The method of claim 2, wherein the at least one transceiver is configured to transmit a signal instructing the WD to direct a beam to the reconfigurable reflective surface.

16. The method of claim 2, wherein the determined configuration is selected based at least in part on a pilot signal received from the WD.

17. A controller in communication with a reconfigurable reflective surface, the controller configured to communicate with a network node, the controller comprising:
a transceiver configured to:
receive, from the network node, a sounding beam at a carrier frequency;

processing circuitry in communication with the transceiver, the processing circuitry configured to:
   use the sounding beam to determine a configuration capability of the reconfigurable reflective surface at the carrier frequency for reflecting incoming radio waves from the network node;
the transceiver further configured to:
   transmit, to the network node, capability information indicating the configuration capability of the reconfigurable reflective surface at the carrier frequency;
   receive from the network node an indication of a configuration of the reconfigurable reflective surface; and
the processing circuitry further configured to:
   cause the transceiver to transmit at least one signal to the reconfigurable reflective surface to configure the reconfigurable reflective surface according to the indicated configuration, the indicated configuration being associated with at least one reflection coefficient.

18. A method in a controller in communication with a reconfigurable reflective surface, the controller configured to communicate with a network node, the method comprising:
   receiving, from the network node, a sounding beam at a carrier frequency;
   using the sounding beam to determine a configuration capability of the reconfigurable reflective surface at the carrier frequency for reflecting incoming radio waves from the network node;
   transmitting, to the network node, capability information indicating the configuration capability of the reconfigurable reflective surface at the carrier frequency;
   receiving from the network node an indication of a configuration of the reconfigurable reflective surface; and
   sending at least one signal to the reconfigurable reflective surface to configure the reconfigurable reflective surface according to the indicated configuration, the indicated configuration being associated with at least one reflection coefficient.

\* \* \* \* \*